(12) United States Patent
Brush et al.

(10) Patent No.: US 10,370,459 B2
(45) Date of Patent: Aug. 6, 2019

(54) ALKYL HYDROXYALKYL CELLULOSE ETHERS, METHODS OF MAKING, AND USE IN CEMENTS AND MORTARS

(71) Applicant: HERCULES INCORPORATED, Wilmington, DE (US)

(72) Inventors: Kelly A. Brush, Newark, DE (US); Patrick J. Cowan, Hockessin, DE (US); Wilfried Adolphe Hohn, Erfstadt (DE); Alexander Adolphe Kindler, Ratingen (DE); Vera Louise Nilles, Teutonenstraße (DE)

(73) Assignee: HERCULES LLC, Wilmington, DE (US)

( * ) Notice: Subject to any disclaimer, the term of this patent is extended or adjusted under 35 U.S.C. 154(b) by 137 days.

(21) Appl. No.: 14/338,738

(22) Filed: Jul. 23, 2014

(65) Prior Publication Data

US 2015/0144032 A1    May 28, 2015

Related U.S. Application Data

(63) Continuation-in-part of application No. 14/208,422, filed on Mar. 13, 2014.

(Continued)

(51) Int. Cl.
*C04B 28/04* (2006.01)
*C04B 16/02* (2006.01)
(Continued)

(52) U.S. Cl.
CPC .............. *C08B 11/08* (2013.01); *C04B 16/02* (2013.01); *C04B 24/383* (2013.01); *C04B 28/02* (2013.01);
(Continued)

(58) Field of Classification Search
CPC ......... C04B 28/04; C04B 16/02; C04B 28/02; C04B 40/0608; C04B 40/0641;
(Continued)

(56) References Cited

U.S. PATENT DOCUMENTS

| 4,036,301 A | 7/1977 | Powers et al. |
| 4,466,837 A | 8/1984 | Chattrji et al. |

(Continued)

FOREIGN PATENT DOCUMENTS

| WO | 2012005960 | 1/2012 |
| WO | 2013081836 | 6/2013 |
| WO | 2013085900 | 6/2013 |

*Primary Examiner* — Shuangyi Abu Ali
(74) *Attorney, Agent, or Firm* — William J. Davis; Nathalie Tietcheu

(57) ABSTRACT

Disclosed are methods for the preparation of alkyl hydroxyalkyl cellulose ethers, and the use of such alkyl hydroxyalkyl cellulose ethers in the preparation and use of mortars and other cement-based systems; also disclosed is a hydraulic composition containing at least one retarder, at least one accelerator and a cellulose ether having a prolonged open time without deterioration of the other cement tile adhesive properties such as workability, setting time, strength development and sag resistance; and further disclosed are dry mortars containing encapsulated calcium chloride used in preparing mortar materials for use in construction, and the preparation and use of such mortars in cold weather environments is also disclosed.

13 Claims, 3 Drawing Sheets

Related U.S. Application Data

(60) Provisional application No. 61/908,499, filed on Nov. 25, 2013, provisional application No. 61/917,753, filed on Dec. 18, 2013.

(51) Int. Cl.
*C08B 11/08* (2006.01)
*C04B 28/02* (2006.01)
*C04B 24/38* (2006.01)
*C08B 11/20* (2006.01)
*C04B 111/00* (2006.01)

(52) U.S. Cl.
CPC ..... *C08B 11/20* (2013.01); *C04B 2111/00672* (2013.01)

(58) Field of Classification Search
CPC ..... C04B 24/383; C04B 12/04; C04B 14/303; C04B 2103/10; C04B 2103/20; C04B 22/0013; C04B 22/08; C04B 22/085; C04B 22/10; C04B 24/04; C04B 22/124; C04B 22/14; C04B 22/16; C04B 22/165; C04B 24/06; C04B 2111/00672; C08B 11/193; C08B 11/08; C08B 11/20
See application file for complete search history.

(56) References Cited

U.S. PATENT DOCUMENTS

| | | |
|---|---|---|
| 4,654,085 A | 3/1987 | Schinski |
| 5,187,011 A | 2/1993 | Manalastas et al. |
| 5,976,507 A | 11/1999 | Wong et al. |
| 5,997,601 A | 12/1999 | Kust |
| 6,444,316 B1 | 9/2002 | Reddy et al. |
| 6,797,291 B2 | 9/2004 | Richardson |
| 6,891,034 B2 | 5/2005 | Dannhorn et al. |
| 7,005,515 B2 | 2/2006 | Schneider et al. |
| 7,402,668 B2 | 7/2008 | Dannhorn et al. |
| 7,442,439 B2 | 10/2008 | Joseph et al. |
| 7,588,635 B2 | 9/2009 | Yamakawa et al. |
| 8,430,957 B2 | 4/2013 | Hohn et al. |
| 2003/0065165 A1* | 4/2003 | Dannhorn ............ C08B 11/193 536/91 |
| 2005/0139130 A1 | 6/2005 | Partain, III et al. |
| 2005/0240016 A1 | 10/2005 | Schlesiger et al. |
| 2008/0262216 A1 | 10/2008 | Hayakawa et al. |
| 2012/0006233 A1 | 1/2012 | Lee et al. |
| 2012/0289627 A1 | 11/2012 | Choi et al. |
| 2013/0193370 A1 | 8/2013 | Adden et al. |

\* cited by examiner

ALKYL HYDROXYALKYL CELLULOSE ETHERS, METHODS OF MAKING, AND USE IN CEMENTS AND MORTARS

CROSS REFERENCE TO RELATED APPLICATIONS

The present application claims the benefit under 35 U.S.C. 119 (e) of U.S. Provisional Patent Application Ser. No. 61/908,449, filed Nov. 25, 2013 and U.S. Provisional Patent Application Ser. No. 61/917,753, filed on Dec. 18, 2013, and under 35 U.S.C. the entire contents of which are hereby expressly incorporated herein by reference.

The present application is also a continuation in part of U.S. application Ser. No. 14/208,422 filed on Mar. 13, 2014, which claims the benefit of U.S. Provisional Patent Application Ser. No. 61/787,219, filed Mar. 15, 2013, the entire contents of both of which are incorporated herein by reference in their entirety.

BACKGROUND OF THE INVENTION

1. Field of the Disclosed and Claimed Inventive Concepts

The presently disclosed and/or claimed inventive process (es), procedure(s), method(s), product(s), result(s), and/or concept(s) (collectively hereinafter referred to as the "presently disclosed and/or claimed inventive concept(s)") relates generally to methods for the preparation of alkyl hydroxyalkyl cellulose ethers. More particularly, but not by way of limitation, the presently disclosed and/or claimed inventive concept(s) further relate to the use of such alkyl hydroxyalkyl cellulose ethers in the preparation and use of mortars and other cement-based systems. The presently disclosed and/or claimed inventive concept(s) also relates generally to a hydraulic and/or dry cement mortar composition with a prolonged open time, more particularly, the composition comprises at least one retarder, and/or at least one accelerator, and such alkyl hydroxyalkyl cellulose ethers. The presently disclosed and/or claimed inventive concept(s) also relates generally to dry mortars containing encapsulated calcium chloride, and such alkyl hydroxyalkyl cellulose ethers, and their use in preparing mortar materials for use in construction, and more particularly, their preparation and use in cold weather environments.

2. Background and Applicable Aspects of the Presently Disclosed and Claimed Inventive Concept(s)

Cellulosic ethers (CEs) are a class of water-soluble organic polymers utilized in a variety of technology applications such as building and construction, pharmaceuticals, energy, electronics, the food and beverage industry, surface coatings and paint. CEs provide a variety of desired physical and rheological characteristics. One such example is the ability of CEs to increase the viscosity of aqueous media. Alkyl, hydroxyalkyl, or alkylhydroxyalkyl CEs have been extensively utilized in cement-based applications such as cementitious tile adhesives, tile grouts, etc. The wide-spread usage of alkylhydroxyalkyl CEs in the building and construction industry is in large part due to the unique rheological properties attained with these organic polymers. They improve physical properties such as viscosity, workability, adhesion to substrate, open time, consistency, water-retention, stickiness, and sag resistance.

Processes for preparing CEs are well-known in the art. Alkyl hydroxyalkyl CEs are commonly prepared by reacting an alkylene oxide and an alkyl halogenide at the same time during the etherification stage of the process.

In the synthesis of alkylhydroxyalkyl CEs, the cellulosic anhydroglucose hydroxyls are subjected to alkaline conditions and reacted with etherification agents. The properties and characteristics of the final polymer formed will be determined by the choice of etherification agent(s) as well as the process conditions utilized. When an alkylene oxide/oxirane is reacted with a cellulosic hydroxyl under alkaline conditions, a reactive intermediate is formed. This intermediate can further react with any etherification agents present in the reaction medium. If reaction occurs further with an alkylene oxide/oxirane, oligoether chains can result. If alkyl halogenides or other etherification agents that do not generate a reactive functional group are reacted the resultant ether cannot react further. This is commonly referred to as capping.

It has been found that % unsubstituted anhydroglucose units, enzyme unsubstituted weight %, and blockiness index can be controlled to a great extent by using a modified process for alkylhydroxyalkyl CE synthesis, as described herein. The hydroxyalkyl CEs obtained demonstrate much faster setting times in cement-based systems in comparison to conventional/hitherto existing/standard CEs/not using the alkyl hydroxyalkyl cellulose ether prepared as described above and result in improved strength values. These CE compositions can be used in cement-based applications to provide rheological advantages such as easy workability and improvements in viscosity, workability, open time, consistency, water-retention, stickiness, and sag resistance while at the same time providing desired setting time and strength profiles.

In addition, for mortar applications, evaporation and absorption of water through porous substrates on which the mortar is applied lead to a depletion of water in the wet mortar over time, which can result in very short open time, correction time, and even issues with adhesion to the substrate. Open time of a mortar is the time in which a tile can still be placed in the applied mortar and sufficient wetting of the tile with mortar is assured. The end of the open time is indicated by having insufficient wetting of mortar on the backside of the tile. Open time is affected by the amount of drying, chemical and physical reactions related to the setting of the cement, and effects of other additives like cellulose ethers and redispersible polymer powders. Additionally, a lack of sufficient water for the proper hydration of cement results in insufficient and incomplete strength development of the mortar.

Cellulose ethers are often added to the mortar to provide water retention, thus reducing water loss due to evaporation and absorption of the substrate and providing constant workability, acceptable correction and open time and proper strength development.

A method of extending open time by adding organic and/or inorganic cement hydration retarders to a cement mortar has widely been used. Through the addition of retarders, the hydration reactions are decelerated or delayed. Consequently the setting and hardening of the mortar is shifted and open time is prolonged. Setting time is defined in ASTM C266-65. Basically setting time is the time a mortar takes to set or harden at a given thickness. For construction using a cement-based hydraulic composition such as mortar or concrete, the control of setting time is desired with a view to ensuring workability, shortening the construction time and simplifying a curing facility. Such decelerated cement hydration, and delayed setting time, due to the presence of a retarder, leads to a higher risk of water loss resulting in insufficient strength development.

Thus, there is a need to have a mortar having a long open time without unduly delaying the setting time. Surprisingly, it has been found that the positive gain in open time by usage of a retarder is not reversed if an accelerator is added to compensate for the cement setting time retardation resulting from the retarder. It has even been found that a retarder-accelerator combination can generate a synergistic effect, meaning that the combination can even have a longer open time compared with a retarder alone.

Further, calcium chloride is generally known as an effective accelerator for cementitious systems. Calcium chloride compounds such as anhydrous $CaCl_2$, $CaCl_2.H_2O$, $CaCl_2.2H_2O$, and $CaCl_2.4H_2O$ are exothermic when hydrated, making them especially suitable for cold weather applications. However, such calcium chloride compounds are each hygroscopic and deliquescent (with anhydrous $CaCl_2$ being very hygroscopic and deliquescent) and can each form an aqueous solution when exposed to humid air, making it difficult to handle. Thus, such calcium chloride compounds, when stored in humid air, each soon become a hydrated solution which is unsuitable for use in a dry mortar application. For this reason, calcium formate, which is not as hygroscopic, is typically used in dry mortar applications instead of calcium chloride. However, calcium formate is an inferior accelerator as compared to calcium chloride. For example, at least about 0.3 wt % of calcium formate typically has to be present in a mortar before any acceleration begins, whereas as little as 0.05 wt % of calcium chloride in a mortar starts the acceleration. Also, regarding acceleration, around 0.3 wt % of calcium chloride is equivalent to about 0.7 wt % of calcium formate, with each amount typically providing adequate acceleration.

Further, preparation of mortar at low temperatures (below about 15° C.) can be very challenging due to extremely slow cement hydration rates at low temperatures. In such low temperature environments, it often becomes necessary to add heat to the system through: heating the water added to the dry mortar or using heat lamps or heaters to heat the environment or protect the curing mortar with blankets or the like. It is common to use accelerators to ensure a fast hydration of the mortar. So, anhydrous calcium chloride is not only an efficient accelerator but also provides heat to the system when dissolved in water. However, the use of calcium chloride is difficult, as discussed above due to its hygroscopic nature. The water uptake of such calcium chloride compounds present in a dry mortar mix will cause lump formation and caking of the mix, resulting in deteriorated powder properties. The water uptake will also result in decreased active calcium chloride content, undesirable prehydration of the cement, and will make the dry mix more difficult to handle. It has been found that at least partially encapsulating such calcium chloride compounds can overcome these deficiencies upon introduction into a dry mortar composition, wherein hydration of the calcium chloride is prevented or minimized up to the time a wet mortar is prepared.

DETAILED DESCRIPTION OF THE INVENTIVE CONCEPT(S)

Figure 1:
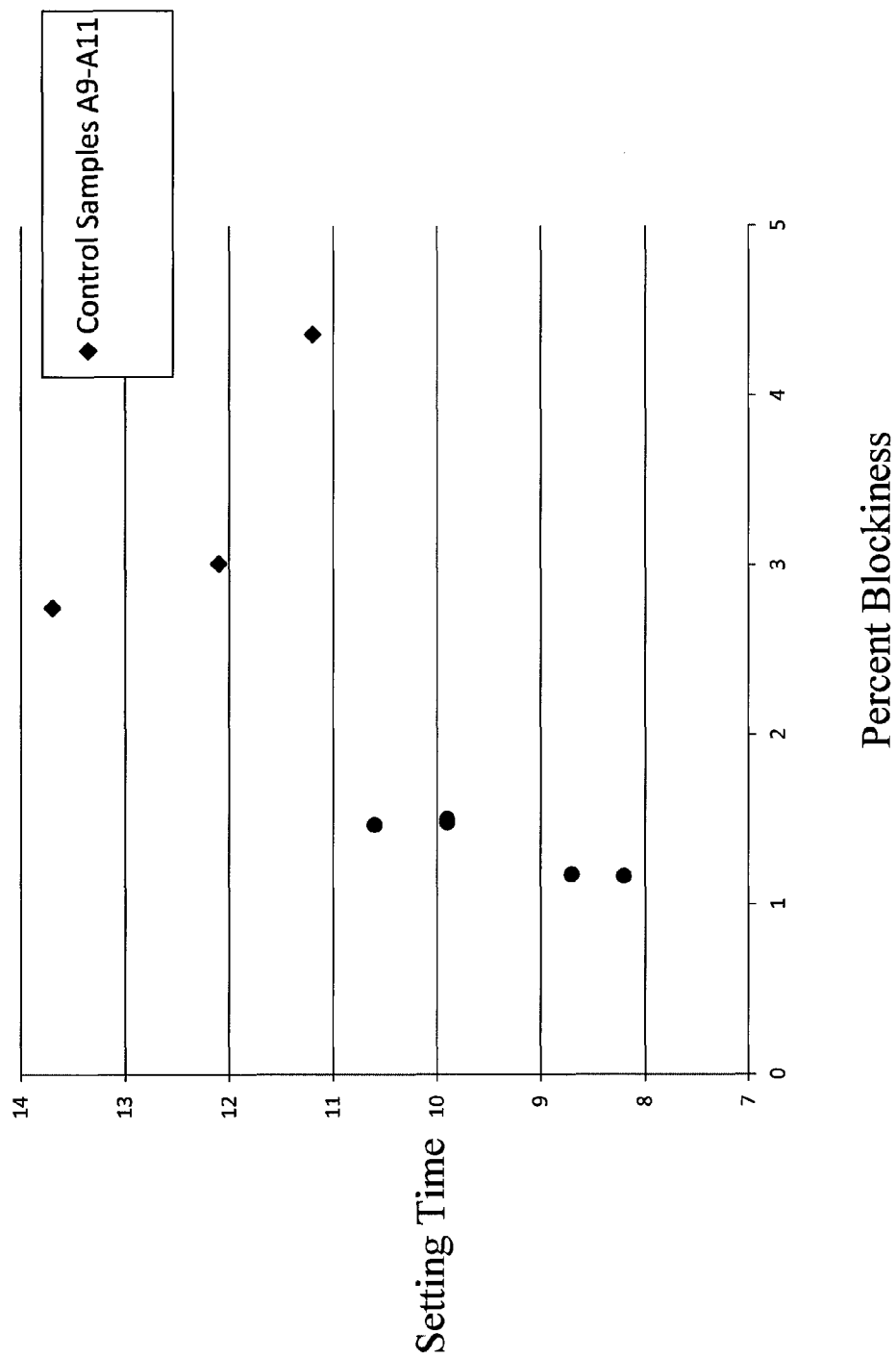
FIG. 1 is a plot showing setting time vs. % blockiness for Control Samples A9-A11 and Samples B1, B2, B10, B15 and B18.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed herein can be made and executed without undue experimentation in light of the present disclosure. While the compositions and methods of the presently disclosed and/or claimed inventive concept(s) have been described in terms of preferred embodiments, it will be apparent to those of ordinary skill in the art that variations may be applied to the compositions and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAAB-CCCC, CBBAAA, CABABB, and so forth. The skilled artisan will understand that typically there is no limit on the number of items or terms in any combination, unless otherwise apparent from the context.

In accordance with an embodiment of the presently disclosed and/or claimed inventive concept(s), a method for preparing an alkyl hydroxyalkyl cellulose ether comprises, consists of, or consists essentially of the steps of:

a) mixing an alkaline solution comprising an alkali metal hydroxide with cellulose and an alkyl halogenide at a temperature of at least about 10° C., or from about 10 to about 80° C., or from about 10 to about 50° C., or from about 15 to about 30° C., to form a first reaction mixture comprising alkali cellulose, water and the alkyl halogenide;

b) adjusting the temperature of the first reaction mixture to from about 50 to about 110° C., or from about 60 to about 110° C., or from about 70 to about 105° C. resulting in the reaction of a portion of the alkyl halogenide with the alkali cellulose forming a second reaction mixture comprising alkyl cellulose ether and unreacted alkyl halogenide, wherein the second reaction mixture is maintained at a temperature in a range of from about 50 to about 110° C., or from about 60 to about 110° C., or from about 70 to about 105° C. for 0 to 60 minutes;

c) adding an alkylene oxide to the second reaction mixture from step b) forming a third reaction mixture;

d) adjusting a temperature of the third reaction mixture to be in a range of from about 60 to about 110° C. and reacting at least a portion of the alkyl cellulose ether with: i) at least a portion of the alkylene oxide, and ii) at least a portion of the unreacted alkyl halogenide, thereby forming a fourth reaction mixture comprising an alkyl hydroxyalkyl cellulose ether having a methyl degree of substitution (D.S.) value of from about 1.40 to about 2.10 or from about 1.55 to about 2.05 or from about 1.61 to about 2.00; and a hydroxyethyl molar substitution (M.S.) value of from about 0.05 to about 0.40 or from about 0.05 to about 0.35 or from about 0.05 to about 0.27; and e) recovering the alkyl hydroxyalkyl cellulose ether from the fourth reaction mixture.

In accordance with an embodiment, the method does not include any further alkalizing following the addition of the alkylene oxide in step c).

The alkali metal hydroxide is present in step a) in an amount of from about 3.00 to about 5.00, or from about 3.20 to about 4.75, equivalents per anhydroglucose unit of the cellulose. The alkali metal hydroxide can be any alkali metal hydroxide capable of providing alkalinity. Particularly, the alkali metal hydroxide can comprise sodium hydroxide.

In accordance with an embodiment, the alkyl halogenide useful as an alkylating agent can contain 1-6 carbon atoms, or 1-4 carbon atoms, or 1-3 carbon atoms, or 1-2 carbon atoms. The alkyl group can be branched or straight chain. The halogenide portion of the alkyl halogenide can be selected from the group consisting of bromide, chloride, and combinations thereof. Particularly, the alkyl halogenide can be selected from the group consisting of methyl chloride, ethyl chloride, propyl chloride, and combinations thereof.

In accordance with an embodiment, the alkylene oxide can contain 2-4 carbon atoms. Particularly, the alkylene oxide can be selected from the group consisting of ethylene oxide, propylene oxide, butylene oxide, and combinations thereof.

In accordance with an embodiment, the alkyl halogenide comprises methyl chloride, the alkylene oxide comprises ethylene oxide, and the fourth reaction mixture comprises methyl hydroxyethyl cellulose ether.

In accordance with an embodiment, the first reaction mixture can be raised to and held at a temperature between about 70 to about 110° C. for a period of time ranging from greater than about 0 to about 60 minutes in step b) resulting in the formation of the second reaction mixture. Further, the third reaction mixture can be held at the temperature between about 80 to about 110° C. for a period of time ranging from greater than about 0 to about 120 minutes in step d) resulting in the formation of the fourth reaction mixture.

In accordance with an embodiment, the second reaction mixture can be cooled to a temperature from about 25 to about 80° C. prior to the addition of the alkylene oxide in step c) resulting in the formation of the third reaction mixture.

In accordance with an embodiment, the first reaction mixture can be raised to and held at a temperature from about 50 to about 70° C., or from about 60 to about 70° C., for a period of time ranging from greater than about 0 to about 60 minutes in step b) resulting in the formation of the second reaction mixture.

In accordance with an embodiment, the third reaction mixture can be held at the temperature from about 80 to about 110° C. for a period of time ranging from about 10 to about 60 minutes in step d) resulting in the formation of the fourth reaction mixture.

In accordance with an embodiment, the first reaction mixture is raised to and held at a temperature from about 50 to about 70° C., or from about 60 to about 70° C., for a period of time ranging from greater than about 0 to about 30 minutes resulting in the formation of the second reaction mixture.

In accordance with an embodiment, the first, second, third and fourth reaction mixtures can each further comprise a diluent.

In accordance with an embodiment of the presently disclosed and/or claimed inventive concept(s), the method is performed in either a slurry process or a high solids process.

In accordance with an embodiment, the method can be performed as a slurry process containing from about 6.0 to about 8.5 wt % solids or as a high solids process containing from about 15.5 to about 19.0 wt % solids. When the method is performed as a slurry process, the diluent can be, but is not limited to, heptanes, toluene, isopropanol or the like. When the method is performed as a high solids process, the diluent comprises dimethyl ether.

In general, cellulose ethers can be added to a mortar to reduce water loss due to evaporation and absorption of the substrate. Cellulose ethers provide water retention, thus water loss is strongly diminished but not completely prevented. Constant workability, acceptable correction and open time, less crack formation, and especially proper strength development are also provided.

The alkyl hydroxyalkyl cellulose ethers prepared according to the presently disclosed and claimed inventive concept(s) can be used in making hydraulic and/or dry cement mortar formulations, including, but not limited to, cementitious tile adhesives, cement based renders, water proofing membranes, and mineral coatings for insulation systems like ETICS.

In accordance with an embodiment, a dry mixture composition can comprise, consist of, or consist essentially of cement, aggregate, and at least one of the alkyl hydroxyalkyl cellulose ethers prepared as described herein.

In accordance with another embodiment, a dry mixture composition can comprise a hydraulic cement component, aggregate, and at least one of the alkyl hydroxyalkyl cellulose ethers prepared as described herein. The hydraulic cement component can be present in an amount of about 5-80 wt % based on the total weight of the dry mixture composition. In one non-limiting embodiment, the amount of hydraulic cement component added is about 10 to about 75 wt % based on the total weight of the dry mixture composition.

Examples of the hydraulic cement component can include, but are not limited to, Portland cement, Portland-slag cement, Portland-silica fume cement, Portland-pozzolana cement, Portland-burnt shale cement, Portland-limestone cement, Portland-composite cement, blast furnace cement, pozzolana cement, composite cement, and calcium aluminate cement.

The aggregate can comprise any material typically used as an aggregate, such as sand, dolomite, limestone, lightweight aggregates (e.g. perlite, expanded polystyrene, hollow glass spheres), rubber crumbs (recycled from car tires), fly ash, gravel, stones, polymer pellets, and the like. More specifically, the aggregate comprises sand. The aggregates can also have a particle size of up to 2 mm or up to 5 mm.

The aggregate can also be a fine aggregate. By "fine" is meant that the aggregate materials have particle sizes up to about 2.0 mm, or up to about 1.0 mm. In one non-limiting embodiment, the fine aggregates can have a particle size of up to 1 mm. The lower limit of particle size can be at least 0.0001 mm. In one non-limiting embodiment, the lower limit of particle size can be at least 0.001 mm.

The amount of aggregate can be about 20 to about 90 wt % based on the total weight of the dry mixture composition. In one non-limiting embodiment, the amount of aggregate added is from about 25 to about 80 wt % based on the total weight of the dry mixture composition.

The amount of the alkyl hydroxyalkyl cellulose ethers used in the presently disclosed and claimed inventive concept(s) can be in a range of from 0.01-5 wt % based on the total weight of the dry mixture composition. In one non-limiting embodiment, the amount of the alkyl hydroxyalkyl cellulose ethers can be in a range of from 0.05-2 wt % based on the total weight of the dry mixture composition. In another non-limiting embodiment, the amount of the alkyl hydroxyalkyl cellulose ethers can be in a range of from 0.1-1 wt % based on the total weight of the dry mixture composition.

The presently disclosed and claimed inventive concept(s) also relates to a method of making the dry mixture composition. The method comprises admixing the alkyl hydroxyalkyl cellulose ether as specified above to the other components of the dry mixture composition described above.

The total amounts of the various compounds in the final dry mixture composition should be in appropriate ranges for the particular application and conditions, which can be identified by the person skilled in the art based on his/her knowledge and routine tests.

In accordance with an embodiment of the presently disclosed and/or claimed inventive concept(s), a process for preparing a wet mortar is provided and comprises mixing the dry mixture composition described above with water.

The mortar can be cured to form a cured mortar. The cured mortar has a 7-day tensile strength higher than the 7-day tensile strength of an otherwise identical cured mortar not prepared using the alkyl hydroxyalkyl cellulose ether prepared as described herein. The cured mortar also has a 24-hour tensile strength higher than the 24-hour tensile strength of an otherwise identical cured mortar not prepared using the alkyl hydroxyalkyl cellulose ether prepared as described herein. The cured mortar also has a tensile strength higher than the tensile strength of an otherwise identical cured mortar not prepared using the alkyl hydroxyalkyl cellulose ether prepared as described herein. The tensile strength can be measured according to test method ISO 13007 or any other tensile strength testing norm used in the mortar industry. The cured mortar also has a setting time lower than the setting time of an otherwise identical cured mortar not prepared using the alkyl hydroxyalkyl cellulose ether prepared as described herein.

In accordance with an embodiment, the dry mixture composition described above can further comprise from about 0.001 to about 1 wt %, or from 0.05 to 0.5 wt %, or 0.1 to 0.3 wt % of an accelerator based on the total weight of the dry mixture composition.

The accelerator is a material capable of accelerating hydration of cement and is generally classified into inorganic compounds and organic compounds. The accelerator can be selected from the group of suitable inorganic compounds which can include, but are not limited to, chlorides such as calcium chloride, sodium chloride and potassium chloride; nitrites such as sodium nitrite and calcium nitrite; nitrates such as sodium nitrate and calcium nitrate; sulfates such as calcium sulfate, sodium sulfate and aluminum; thiocyanates such as sodium thiocyanate and calcium thiocyanate; hydroxides such as sodium hydroxide, potassium hydroxide and calcium hydroxide; carbonates such as calcium carbonate, sodium carbonate and lithium carbonate; and alumina analogs such as water glass, aluminum hydroxide and aluminum oxide. Suitable organic compounds can include, but are not limited to, amines such as diethanolamine and triethanolamine; calcium salts of organic acids such as calcium formate and calcium acetate; and maleic anhydride; and combinations thereof. The calcium chloride compounds can include, but are not limited to, anhydrous $CaCl_2$, $CaCl_2.H_2O$, $CaCl_2.2H_2O$, $CaCl_2.4H_2O$, and $CaCl_2.6H_2O$.

In accordance with an embodiment, the dry mixture composition described above can further comprise from about 0.001 to about 0.5 wt %, or from about 0.005 to about 0.3 wt %, or from about 0.01 to about 0.05 wt % of a retarder based on the total weight of the dry mixture composition.

The retarder can comprise, but is not limited to, carboxylic acids and salts thereof such as gluconic acid, glucoronic acid, citric acid, tartaric acid, gluoheptonic acid, mucic acid, malonic acid, malic acid, and crotonic acid; inorganic salts thereof with sodium, potassium, calcium, magnesium and ammonium; saccharides and the corresponding salts such as glucose, sodium gluconate, fructose, galactose, saccharose, xylose, arabinose, ribose, sucrose, mannose; oligosaccharide; dextran; lignosulphonates; phosphonic acids, condensed phosphoric acids, boric acids or salt thereof; and combinations thereof.

The condensed phosphoric acid or salt thereof comprises two or more phosphoric acid or phosphate units, respectively. The condensed phosphoric acids and salts thereof can be di-, oligo-, and poly-phosphoric acids and their salts. In one non-limiting embodiment, the condensed phosphate is a polyphosphate. Examples of the polyphosphates can include, but are not limited to, sodium polyphosphate, calcium polyphosphate, magnesium polyphosphate, ammonium polyphosphate, aluminum polyphosphate, manganese polyphosphate, and combinations thereof.

In accordance with an embodiment, a process for preparing a wet mortar can comprise mixing the dry mixture composition comprising the retarder, as described above, with water. The wet mortar has a visual open time which is at least as long as the visual open time of an otherwise identical mortar not prepared using the alkyl hydroxyalkyl cellulose ether prepared as described above. The mortar can be cured to form a cured mortar. The cured mortar has a 7-day tensile strength higher than the 7-day tensile strength of an otherwise identical cured mortar not prepared using the alkyl hydroxyalkyl cellulose ether prepared as described herein. The cured mortar also has a 24-hour tensile strength higher than the 24-hour tensile strength of an otherwise identical cured mortar not prepared using the alkyl hydroxyalkyl cellulose ether prepared as described herein. The cured mortar also has a tensile strength higher than the tensile strength of an otherwise identical cured mortar not prepared using the alkyl hydroxyalkyl cellulose ether prepared as described herein. The tensile strength measurement can be according to test method ISO 13007 or any other tensile strength testing norm used in the mortar industry. The cured mortar also has a setting time lower than the setting time of an otherwise identical cured mortar not prepared using the alkyl hydroxyalkyl cellulose ether prepared as described herein.

In accordance with an embodiment, the dry mixture composition described above can further comprise from about 0.005 to about 5 wt % of a retarder/accelerator combination based on the total weight of the dry mixture composition.

In accordance with an embodiment, a process for preparing a wet mortar can comprise mixing the dry mixture composition comprising the retarder/accelerator combination, as described above, with water. The wet mortar has a visual open time which is at least as long as the visual open time of an otherwise identical mortar not prepared using the alkyl hydroxyalkyl cellulose ether prepared as described above. The mortar can be cured to form a cured mortar. The cured mortar has a 7-day tensile strength higher than the 7-day tensile strength of an otherwise identical cured mortar not prepared using the alkyl hydroxyalkyl cellulose ether prepared as described herein. The cured mortar also has a 24-hour tensile strength higher than the 24-hour tensile strength of an otherwise identical cured mortar not prepared using the alkyl hydroxyalkyl cellulose ether prepared as described herein. The cured mortar also has a tensile strength higher than the tensile strength of an otherwise identical cured mortar not prepared using the alkyl hydroxyalkyl cellulose ether prepared as described herein. The tensile strength measurement can be according to test method ISO 13007 or any other tensile strength testing norm used in the mortar industry. The cured mortar also has a setting time lower than the setting time of an otherwise identical cured mortar not prepared using the alkyl hydroxyalkyl cellulose ether prepared as described herein.

The dry mixture composition of the presently disclosed and claimed inventive concept(s) further comprises one or more mineral binder of hydrated lime, gypsum, pozzolana, blast furnace slag, hydraulically active calcium hydrosilicates and hydraulic lime. The additional mineral binders can be present in the amount of about 0.1-90 wt % based on the total weight of the dry mixture composition.

The dry mixture composition according to the presently disclosed and claimed inventive concept(s) can be prepared by a wide variety of techniques known for one of ordinary skill in the art. Examples can include, but are not limited to, simple dry blending, combining different components during spray drying process, spraying of solutions or melts onto dry materials, co-extrusion, or co-grinding.

In accordance with an embodiment, the dry mixture composition can further comprise from about 0.01 to about 25 wt %, or from about 0.05 to about 20 wt %, or from about 0.05 to about 10 wt %, or from about 0.1 to about 5 wt % of capsules comprising a $CaCl_2$ compound at least partially coated with a coating material; wherein the $CaCl_2$ compound preferably comprises a compound selected from the group consisting of anhydrous $CaCl_2$, $CaCl_2.H_2O$, $CaCl_2.2H_2O$, $CaCl_2.4H_2O$, and combinations thereof.

In accordance with an embodiment, a process for preparing a wet mortar can comprise mixing the dry mixture composition comprising the capsules and an alkyl hydroxyalkyl cellulose ether prepared as described herein, with water and thereby applying shear forces which cause rupture of the capsules, thus releasing the active ingredients. The mortar can be cured to form a cured mortar. The cured mortar has a 7-day tensile strength higher than the 7-day tensile strength of an otherwise identical cured mortar not prepared using the alkyl hydroxyalkyl cellulose ether prepared as described herein. The cured mortar also has a 24-hour tensile strength higher than the 24-hour tensile strength of an otherwise identical cured mortar not prepared using the alkyl hydroxyalkyl cellulose ether prepared as described herein. The cured mortar also has a tensile strength higher than the tensile strength of an otherwise identical cured mortar not prepared using the alkyl hydroxyalkyl cellulose ether prepared as described herein. The tensile strength measurement can be according to test method ISO 13007 or any other tensile strength testing norm used in the mortar industry. The cured mortar also has a setting time lower than the setting time of an otherwise identical cured mortar not prepared using the alkyl hydroxyalkyl cellulose ether prepared as described herein.

Alternatively, or additionally, the dry mixture composition according to the presently disclosed and claimed inventive concept(s) may include one or more water-soluble or at least water-swellable polysaccharides including, for example, but not by way of limitation, pectin, guar gum, guar derivatives like guar ethers, gum arabic, xanthan gum, dextran, cold-water-soluble starch, starch derivatives like starch ethers, chitin, chitosan, xylan, welan gum, succinoglycan gum, diutan gum, scleroglucan gum, gellan gum, mannan, galactan, glucan, alginate, arabinoxylan, cellulose fibers, and combinations thereof.

The total amounts of the various compounds in the final dry mixture composition should be in appropriate ranges for the particular application and conditions, which can be identified by the person skilled in the art, based on his/her knowledge and routine tests.

In accordance with an embodiment, a process for preparing a wet mortar can comprise mixing the dry mixture composition comprising an alkyl hydroxyalkyl cellulose ether prepared as described herein, with water. The mortar can be cured to form a cured mortar. The cured mortar has a 7-day tensile strength higher than the 7-day tensile strength of an otherwise identical cured mortar not prepared using the alkyl hydroxyalkyl cellulose ether prepared as described herein. The cured mortar also has a 24-hour tensile strength higher than the 24-hour tensile strength of an otherwise identical cured mortar not prepared using the alkyl hydroxyalkyl cellulose ether prepared as described herein. The cured mortar also has a tensile strength higher than the tensile strength of an otherwise identical cured mortar not prepared using the alkyl hydroxyalkyl cellulose ether prepared as described herein. The tensile strength measurement can be according to test method ISO 13007 or any other tensile strength testing norm used in the mortar industry. The cured mortar also has a setting time lower than the setting time of an otherwise identical cured mortar not prepared using the alkyl hydroxyalkyl cellulose ether prepared as described herein.

Basically setting time is the time when a mortar takes to set or harden at a given thickness. For construction using a cement-based mortar or concrete, the control of setting time is desired with a view to ensuring strength development, workability, shortening the construction time and simplifying a curing facility.

The delay in cement hydration reactions and consequently in setting time in general comes along with decreased strength development. In general, the slower the cement hydration is, i.e., the longer the setting time is, the higher the risk of water loss and thus of insufficient strength development.

Setting time can be determined via measurement of ultrasonic wave velocity through a mortar sample. The further the hydration proceeds the faster an ultrasonic wave is conducted through the mortar sample. Depending on the cement and mortar formulation the velocity of the ultrasonic wave approaches a value of about 2000 m/s. Setting time is determined when half of the hydration is completed, thus, when a velocity of 1000 m/s is reached.

In accordance with an embodiment, the dry mixture composition can further comprise from about 0.005 to about 80 wt %, or from about 0.5 to about 30 wt % of at least one additive selected from the group consisting of: organic or inorganic thickening agents, secondary water retention agents, anti-sag agents, air entraining agents, wetting agents, defoamers, superplasticizers, dispersants, calcium-complexing agents, water repellants, redispersible powders, biopolymers, fibers, calcium chelating agents, freezing point depressants, fruit acids and salts thereof, surface active agents, water-reducing agents, water-soluble or water-swellable polysaccharides, gelatin, polyethylene glycol, casein, lignin sulfonates, naphthalene-sulfonate, sulfonated melamine-formaldehyde condensate, sulfonated naphthalene-formaldehyde condensate, polyacrylates, polycarboxylate ether, polystyrene sulphonates, phosphates, phosphonates, calcium-salts of organic acids having 1 to 4 carbon atoms such as calcium formate, salts of alkanoates, aluminum sulfate, metallic aluminum, bentonite, montmorillonite, sepiolite, polyamide fibers, polypropylene fibers, polyvinyl alcohol, and homo-, co-, or terpolymers based on vinyl acetate, maleic ester, ethylene, styrene, butadiene, vinyl versatate, and acrylic monomers, and combinations thereof. Examples of water-reducing agents can include, but are not limited to, melamine-based, lignin-based, and polycarboxylate-based compounds. Defoamers used herein can include, but are not limited to, polyether, silicone, alcohol, mineral oil, vegetable oil, and non-ionic surfactants.

In the practice of the presently disclosed and claimed inventive concept(s), a polymer emulsion may be used, if necessary, for improving the adhesion to the body or wear resistance. The polymer emulsion may take the form of liquid or redispersible powder. Most emulsions that are commercially available as the premix for on-site mixing are polymer emulsions of the powder (redispersible) type.

Water-redispersible polymer powders are those which break down into primary particles in water, and then dispersed ("redispersed") in water. The use of such water-redispersible polymer powders in dry-mix mortars is common and known to improve, depending on the type and addition rate, the adhesion on all kinds of substrates, the deformability of the mortars, the flexural strength and the abrasion resistance, to name only a few of several properties. The polymer powder can comprise one or more compounds selected from homopolymers and/or copolymers and/or terpolymers of one or monomers selected from the group of vinyl esters of unbranched or branched $C_1$-$C_{15}$ alkylcarboxylic acids, (meth)acrylic ester of $C_1$-$C_{15}$ alcohols, vinylaromatics, olefins, dienes, and vinyl halogenides.

In one non-limiting embodiment, vinyl esters can be vinyl acetate; vinyl propionate; vinyl butyrate; vinyl 2-ethylhexanoate; vinyl laurate; 1-methylvinyl acetate; vinyl pivalate; vinyl acetate-ethylene copolymers with an ethylene content of from about 1 to about 60% by weight; vinyl ester-ethylene-vinyl chloride copolymers with an ethylene content of from about 1 to about 40% by weight and a vinyl chloride content of from about 20 to about 90% by weight; vinyl acetate copolymers with from about 1 to about 50% by weight of one or more copolymerizable vinyl esters such as vinyl laurate, vinyl pivalate, and vinyl esters of alpha-branched monocarboxylic acids having from about 5 to about 11 carbon atoms, especially Versatic acid vinyl esters, which may also contain from about 1 to about 40% by weight of ethylene; and vinyl acetate-acrylic ester copolymers with from about 1 to about 60% by weight of acrylic ester, especially n-butyl acrylate or 2-ethylhexyl acrylate, and which may also contain from 1 to 40% by weight of ethylene.

If desired, the polymers may also contain from about 0.1 to about 10% by weight, based on the overall weight of the polymer, of functional comonomers. These functional comonomers may include, but are not limited to, ethylenically unsaturated monocarboxylic or dicarboxylic acids such as acrylic acid; ethylenically unsaturated carboxyamides such as (meth)acrylamide; ethylenically unsaturated sulfonic acids and/or their salts such as vinylsulfonic acid; polyethylenically unsaturated comonomers such as divinyl adipate, diallyl maleate, allyl methacrylate and triallyl cyanurate; and/or N-methylol (meth)acrylamides and their ethers, for example their isobutoxy or n-butoxy ethers.

Methacrylic esters or acrylic esters can be, but are not limited to, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and copolymers of methyl methacrylate with 1,3-butadiene.

Vinylaromatics can be, but are not limited to, styrene, methylstyrene, and vinyltoluene, styrene-butadiene copolymers and styrene-acrylic ester copolymers such as styrene-n-butyl acrylate or styrene-2-ethylhexyl acrylate, each with a styrene content of from about 10 to about 70% by weight.

Vinyl halide can be vinyl chloride. Vinyl chloride polymers can be, but are not limited to, vinyl ester/vinyl chloride/ethylene copolymers, vinyl chloride-ethylene copolymers and vinyl chloride-acrylate copolymers.

In one non-limiting embodiment, olefins can be ethylene and propylene, and dienes can be 1,3-butadiene and isoprene.

The polymers can be prepared in a conventional manner. In one non-limiting embodiment, the polymer can be prepared by an emulsion polymerization process. The dispersions used may be stabilized with emulsifier or else with a protective colloid, an example being polyvinyl alcohol. To prepare the water-redispersible polymer powders, the polymer dispersion obtainable in this way can be dried. Drying may be conducted by means of spray drying, freeze drying, or by coagulation of the dispersion and subsequent fluidized bed drying. The water-redispersible polymer powder may comprise one or more compounds selected from protective colloids and antiblocking agents. EP1498446A1 discloses methods and examples of producing such water-redispersible polymer powders, the entire contents of which is hereby expressly incorporated herein by reference.

The amount of polymer emulsion added can be in a range of 0.5 to 15% calculated as solids, based on the total weight of the overall system. In one non-limiting embodiment, the amount of polymer emulsion added can be in a range of 0.5 to 10% by weight, calculated as solids, based on the total weight of the overall system. If the amount of polymer emulsion added is less than the range, it may fail to achieve the desired durability and bonding force. If the amount of polymer emulsion added is more than the range, there may be a likelihood of air entrainment, resulting in drawbacks such as damaged surface appearance and a strength drop.

In the case of a cement mortar, water can be added in an amount of 10 to 80% by weight based on the total weight of the cement mortar. In one non-limiting embodiment, water can be added in an amount of 17 to 37% by weight. In another non-limiting embodiment, water can be added in an amount of 20 to 35% by weight.

In accordance with an embodiment of the presently disclosed and/or claimed inventive concept(s), a process for preparing a mortar comprises, consists of, or consists essentially of the steps of:
a) combining a first dry mixture comprising, consisting of, or consisting essentially of cement and aggregate with capsules comprising, consisting of, or consisting essentially of a $CaCl_2$ compound at least partially coated with a coating material to form a second dry mixture; wherein the $CaCl_2$ compound comprises, consists of, or consists essentially of a compound selected from the group consisting of anhydrous $CaCl_2$, $CaCl_2 \cdot H_2O$, $CaCl_2 \cdot 2H_2O$, $CaCl_2 \cdot 4H_2O$, and combinations thereof; and wherein, on average for the capsules, at least about 70% by weight, or at least about 80% by weight, or at least about 90% by weight of the $CaCl_2$ compound surfaces are coated by the coating material;
b) adding water to the second dry mixture thereby forming a water-containing mixture; and
c) mixing the water-containing mixture, thereby applying shear forces to breach the coating material of the capsules to release the $CaCl_2$ compound and form the mortar; wherein the water hydrates the $CaCl_2$ compound resulting in a release of at least about 50 kJ/kg of $CaCl_2$ compound and thereby raising the temperature of the mortar.

The first dry mixture can also further comprise the alkyl hydroxyalkyl cellulose ether prepared as described herein.

The first dry mixture, or the second dry mixture, or the water-containing mixture, or the curing conditions, or any combination thereof, can each be at a temperature less than or equal to about 15° C., or less than or equal to about 10° C., or less than or equal to about 8° C., or less than or equal to about 5° C., or less than or equal to about −5° C. Also, the ambient temperature at which step b), or step c), or both steps b) and c), is/are performed can be less than or equal to about 15° C., or less than or equal to about 10° C., or less than or equal to about 8° C., or less than or equal to about 5° C., or less than or equal to about −5° C.

The water-containing mixture is subjected to shear forces which are sufficient to breach the coating material.

The time period for hydration of the cement in mortar prepared in accordance with the presently disclosed and/or claimed inventive concept(s) is reduced as compared to the time period for hydration of cement in an identical mortar not prepared using the capsules, as described herein. Also, the average particle size of the capsules can be less than or equal to about 5 mm, or less than or equal to about 2 mm.

The coating material can be hydrophobic; and further the coating material can comprise, consist of, or consist essentially of hydrogenated vegetable oil. Also, the second dry mixture can comprise from about 0.001 to about 10 wt %, or from about 0.01 to about 5 wt %, or from about 0.1 to about 2.5 wt % of the $CaCl_2$ compound.

Alternatively, the first dry mixture can further comprise an accelerator and a retarder, as described herein, and in the amounts as described herein. Also, the first dry mixture can further comprise any of the other additives disclosed herein, or combinations thereof, and in the amounts as described herein.

In accordance with an embodiment, and as shown in the examples below, when the mortar as described above is cured to form a cured mortar, the cured mortar has a compressive strength higher than the compressive strength of an otherwise identical cured mortar not prepared using the capsules, and has a flexural strength (also known as bending tensile strength) higher than the flexural strength of the otherwise identical cured mortar not prepared using the capsules, and has a tensile strength higher than the tensile strength of the otherwise identical cured mortar not prepared using the capsules.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

Preparation of Dry Tile Cement Mortars and Testing

A dry tile cement mortar formulation was prepared based on the component amounts shown in Table 1 below.

TABLE 1

| Composition | Wt % |
| --- | --- |
| Portland cement CEM I 52.5R | 35 |
| Fine silica sand F35 | 64.6 |
| Methylhydroxyethyl cellulose ether prepared in Examples below | 0.4 |

500 g of the dry tile cement mortar formulation was added to a certain amount of water within 15 seconds to form a sample. The amount of water added was determined based on comparable (480,000 to 520,000 mPas) Helipath viscosity. The sample was mixed for about 30 seconds with a hand mixer (Braun multimix 300 Watt) on speed number 1 and 2 kneaders. Then, the sample was mixed furthermore for 45 seconds on speed number 2 to form a tile cement mortar sample. The tile cement mortar sample was allowed to rest for about 5 minutes. The tile cement mortar sample was remixed for 15 seconds on speed number 1 with hand mixer. After mixing, the Helipath viscosity of the mortar was determined and the tile cement mortar was filled into a form of the ultra sonic device for determination of the setting time. Directly after that, the residual tile cement mortar was applied on the concrete slab for later determination of the tensile strength after storage in a climate chamber.

Testing Methods for Tile Cement Mortars

Setting time was determined via measurement of ultrasonic wave velocity through the sample. The further the hydration proceeded the faster an ultrasonic wave was conducted through the mortar sample. Depending on the cement and mortar formulation the velocity of the ultrasonic wave approached a final value of about 2000 m/s. Setting time was determined for each mortar sample when half of the hydration was completed, thus when a velocity of 1000 m/s was reached.

For the tensile strength tests, the prepared tile cement mortar sample was mixed, applied on a concrete slab and tested in accordance with ISO13007-2. For tensile strength determination, the tile cement mortar sample was applied with a notched trowel (6×6 mm) on a concrete slab. After five minutes, four 5×5 cm stoneware tiles were embedded by loading with a 2 kg weight for 30 seconds. The concrete slab with the applied tile cement mortar and embedded tiles were stored in the climate chamber at 23.0° C. and 50% relative humidity (r.H.). The tensile strength after storage for 24 hours, and/or 3 days and/or 7 days was determined.

Preparation, Measurements and Testing of Methylhydroxyethyl Cellulose Ethers

Example A

High Solids Process, with Venting

Reagent quantities used in the preparation of Control Samples A1-A12 are shown in Table 2 below.

TABLE 2

| Control Sample No. | MeCl (g) | EO (g) | Caustic 50% NaOH (g) | 1st DME (g) | 2nd DME (g) | % Solids |
| --- | --- | --- | --- | --- | --- | --- |
| A1 | 226.20 | 16.00 | 278.40 | 88.40 | 88.60 | 17.7 |
| A2 | 223.90 | 7.80 | 276.20 | 89.70 | 87.50 | 18.0 |
| A3 | 228.20 | 15.60 | 296.60 | 83.70 | 83.80 | 17.5 |
| A4 | 225.60 | 19.00 | 298.00 | 81.50 | 85.10 | 17.5 |
| A5 | 227.50 | 19.00 | 295.00 | 84.00 | 83.80 | 17.4 |
| A6 | 228.10 | 19.00 | 298.40 | 84.00 | 82.70 | 17.4 |
| A7 | 228.60 | 19.00 | 296.80 | 84.50 | 82.20 | 17.4 |
| A8 | 226.60 | 19.00 | 295.00 | 84.20 | 84.60 | 17.5 |
| A9 | 240.80 | 25.00 | 313.00 | 87.50 | 87.80 | 16.6 |
| A10 | 240.20 | 30.00 | 311.80 | 88.60 | 87.00 | 16.5 |
| A11 | 240.40 | 30.00 | 310.40 | 88.70 | 86.20 | 16.6 |
| A12 | 285.00 | 22.00 | 369.20 | 96.90 | 96.30 | 14.7 |

Preparation of Control Samples A1-A4 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.

b) Under agitation, with the reactor at 25° C., a first quantity of dimethyl ether (DME) was charged to the reactor over 5 minutes. The pressure in the reactor was approximately 75 psig at the end of the dimethyl ether charge.

c) Methyl chloride (MeCl) was charged to the reactor over 10 minutes. The pressure in the reactor was approximately 77 psig at the end of the methyl chloride charge. A second quantity of dimethyl ether was then charged to the reactor over 5 minutes. The pressure was approximately 80 psig at the end of the dimethyl ether charge. A quantity of 50% aqueous sodium hydroxide (NaOH) was charged to the reactor over 15 minutes. The pressure was approximately 82 psig following the 50% aqueous sodium hydroxide charge.

d) The temperature was raised to 87° C. and held at this level for 60 minutes. The pressure was approximately 232 psig at the end of the 87° C. hold.

e) The reactor was then cooled to 50° C. and vented to 14.7 psig during cooling. The reactor was then pressurized to 65 psig with nitrogen and ethylene oxide (EO) was charged to the reactor. The reactor pressure was approximately 68 psig after the ethylene oxide charge.

f) The temperature was raised to and held at 87° C. for 15 minutes. The pressure was approximately 80 psig after reaching 87° C.

g) The reactor was then cooled to at least 30° C. During cooling the reactor was also vented to atmospheric pressure. Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Control Samples A5 and A9

Control Samples A5 and A9 were prepared in the same manner as Control Samples A1-A4, except that after raising the temperature of the contents to 87° C. in step f), there was no temperature hold prior to the cooling in step g).

Preparation of Control Samples A6 and A7

Control Samples A6 and A7 were prepared in the same manner as Control Samples A1-A4, except that after raising the temperature of the contents to 87° C. in step f), there was no temperature hold prior to the cooling in step g); and the cooling temperature in step e) was to 60° C. Also, for Control Sample A7, the hold period in step d) was only 30 minutes.

Preparation of Control Samples A8 and A12

Control Samples A8 and A12 were prepared in the same manner as Control Samples A1-A4, except that after raising the temperature of the contents to 87° C. in step f), there was no temperature hold prior to the cooling in step g); and the cooling temperature in step e) was to 70° C. Also, for Control Sample A12, the temperature in step d) was 95° C.

Preparation of Control Samples A10 and A11

Control Samples A10 and A11 were prepared in the same manner as Control Samples A1-A4, except that after raising the temperature of the contents to 87° C. in step f), there was no temperature hold prior to the cooling in step g). Also, the temperature in step d) was 91° C. for Control Sample A10 and 95° C. for Control Sample A11.

Sample Measurements

Each of the obtained methylhydroxyethyl cellulose ethers A1-A12 was subjected to testing for: % unsubstituted AGU, methyl DS, hydroxyethyl MS, enzyme unsubstituted wt %, and % blockiness.

NMR Method

Samples were acid hydrolyzed prior to NMR measurement.

Sample Hydrolysis:

25 mg of sample was initially swelled in 0.75 gm of $D_2O$. To the swelled sample, 1.5 gm 3M trifluroacetic acid (TFA) in $D_2O$ was added. The solution vial was maintained at 100° C. for 5 hours. Sample vial was cooled for 15 minutes before 0.3 gm of $D_2SO_4$ was added. Sample solution was maintained at 100° C. for one additional hour. The sample solution was allowed to cool down (~30 minutes) and transferred to 5 mm NMR tube for analysis.

NMR Measurement:

Quantitative $^1H$ NMR spectrum was recorded using Bruker 400 MHz NMR spectrometer. Acquisition parameters were as follows: temperature 300K, sweep width 20 ppm, pulse width 45 deg, number of scans 128, relaxation delay 30 s. Processing parameters were as follows: line broadening 0.3 Hz.

Spectrum was phase and baseline corrected using standard practice. Center of the most down-field doublet in the anomeric region (4.32-5.43 ppm) was referenced to 5.231 ppm. The spectrum was integrated as follows:

Region A ($I_A$)=4.32-5.43 ppm (integral area was calibrated to a value of 1.0, other integral areas were relative to this integral value);

Region B ($I_B$)=2.70-4.32 ppm;

Region C ($I_C$)=2.865-2.95 ppm;

Region D ($I_D$)=4.92-5.32 ppm; and

Region E ($I_E$)=5.00-5.028 ppm.

DS/MS and % unsubstituted anhydroglucose (% unsub AGU) were calculated as follows:

HE MS=$I_C$*k (where k is 6.6489, empirical scaling factor);

Methyl DS=($I_B$−(HE MS)−($I_A$*6)); and

% unsub AGU=($I_E/I_D$)*Methyl DS*100.

Enzymatic Hydrolysis

Enzymatic hydrolysis was performed in the presence of a phosphate buffer at pH 6.0 (0.1 M). The sample was weighed (500 mg), accurate to 1 mg. The sample was dissolved in 50 ml phosphate buffer until completely dissolved. 35U of endo-β-glucanase (EC 3.2.2.4) (*Bacillus amyloliquefaciens*) from Megazyme (Bray, Ireland) were added to the sample solution. The hydrolysis was carried out in a shaker at 40° C. for 24 hours. Released unsubstituted glucose wt % by enzyme was detected with a high performance anion exchange chromatography with pulsed amperometric detection (HPAEC-PAD) from Dionex (Sunnyvale, Calif.).

Acid Hydrolysis

Acid hydrolysis was performed on the samples using sulfuric acid. The sample was weighed (250 mg), accurate to 1 mg, then swollen in 72% sulfuric acid until completely dissolved. The solution was diluted with water to 2M sulfuric acid. The solution was refluxed for 5 hours. The hydrolyzed solution was diluted to 100 ml volume flask. Released unsubstituted glucose wt % by acid was detected with a high performance anion exchange chromatography with pulsed amperometric detection system (HPAEC-PAD) from Dionex (Sunnyvale, Calif.). The HPAE-PAD system included a Caropac SA-10 guard, an analytical column, and an electrochemical detector.

Blockiness Index

Blockiness Index is equal to:

100*(Unsubstituted glucose (wt %) release by enzyme/Unsubstituted glucose (wt %) release by acid)

Control Samples A9-A12 were used in the preparation of tile cement mortar samples (as described above). The resulting tile cement mortars were subjected to at least some of the testing methods described above. The results of all of such testing are shown in Table 3 below.

TABLE 3

| Control Sample No. | % Unsub AGU | Methyl DS | HE MS | Enzyme Unsub wt % | % Blockiness | Setting Time Average (h) | 24-Hour Tensile Strength (Average) N/mm² | 7 Day Tensile Strength (N/mm²) | 3 Day Tensile Strength (N/mm²) |
|---|---|---|---|---|---|---|---|---|---|
| A9  | 12.73 | 1.68 | 0.07 | 0.229 | 2.75 | 13.4 | 0.5 | 1.0 | 1.0 |
| A10 | 12.13 | 1.73 | 0.07 | 0.221 | 3.01 | 12.1 | 0.7 | 0.9 | 0.95 |
| A11 | 11.05 | 1.70 | 0.07 | 0.294 | 4.36 | 11.3 | 0.7 | 0.9 | 1.0 |
| A12 | 9.67  | 1.77 | 0.06 | 0.303 | 4.35 | 9.0  | 0.6 | —   | —   |

Example B (Samples B1-B20)

High Solids Process, No Venting

Reagent quantities used in the preparation of Samples B1-B20 are shown in Table 4 below.

TABLE 4

| Sample No. | MeCl (g) | EO (g) | 1st Caustic Charge 50% NaOH (g) | 2nd Caustic Charge 50% NaOH (g) | 1st DME (g) | 2nd DME (g) | % Solids |
|---|---|---|---|---|---|---|---|
| B1  | 228.10 | 9.00  | 285.00 | 0.00  | 84.50 | 82.80 | 17.9 |
| B2  | 227.10 | 16.10 | 283.00 | 0.00  | 82.10 | 82.10 | 17.8 |
| B3  | 229.20 | 16.00 | 286.60 | 0.00  | 83.80 | 83.40 | 17.7 |
| B4  | 228.10 | 16.80 | 283.40 | 0.00  | 82.10 | 82.50 | 17.8 |
| B5  | 228.70 | 16.00 | 277.00 | 0.00  | 85.70 | 84.50 | 17.8 |
| B6  | 226.70 | 16.00 | 281.20 | 0.00  | 83.10 | 83.50 | 17.8 |
| B7  | 227.70 | 9.00  | 280.00 | 0.00  | 83.50 | 82.50 | 18.0 |
| B8  | 229.60 | 16.00 | 286.00 | 0.00  | 86.30 | 83.50 | 17.6 |
| B9  | 228.40 | 16.00 | 280.60 | 0.00  | 83.90 | 82.30 | 17.8 |
| B10 | 225.90 | 8.10  | 200.80 | 80.40 | 86.90 | 87.80 | 17.9 |
| B11 | 222.30 | 8.10  | 203.20 | 75.20 | 87.60 | 87.90 | 18.0 |
| B12 | 223.30 | 16.00 | 202.40 | 75.20 | 86.50 | 89.30 | 17.8 |
| B13 | 224.20 | 12.10 | 214.00 | 75.80 | 87.90 | 88.60 | 17.6 |
| B14 | 225.80 | 15.70 | 206.40 | 74.80 | 87.90 | 89.70 | 17.6 |
| B15 | 222.30 | 8.00  | 277.40 | 0.00  | 86.30 | 89.70 | 18.0 |
| B16 | 223.00 | 16.00 | 279.80 | 0.00  | 89.60 | 88.60 | 17.7 |
| B17 | 222.20 | 16.10 | 276.80 | 0.00  | 86.70 | 91.30 | 17.8 |
| B18 | 222.00 | 8.00  | 276.60 | 0.00  | 88.20 | 86.80 | 18.0 |
| B19 | 229.40 | 16.10 | 284.40 | 0.00  | 83.40 | 85.90 | 17.7 |
| B20 | 228.10 | 16.10 | 280.60 | 0.00  | 84.50 | 84.60 | 17.8 |

Preparation of Samples B1-B2, B6-B9 and B19-B20 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.

b) Under agitation, with the reactor at 25° C., a first quantity of dimethyl ether was charged to the reactor over 5 minutes. The pressure in the reactor was approximately 70 psig at the end of the dimethyl ether charge.

c) Next, methyl chloride was charged to the reactor over 10 minutes. The pressure in the reactor was approximately 73 psig at the end of the methyl chloride charge. Next, a second quantity of dimethyl ether was charged to the reactor over 5 minutes. The pressure was approximately 78 psig at the end of the dimethyl ether charge. A quantity of 50% aqueous sodium hydroxide was charged to the reactor over 15 minutes. The pressure was approximately 80 psig following the 50% aqueous sodium hydroxide charge.

d) The temperature was raised to 95° C. and maintained at this level for 20 minutes. The pressure was approximately 267 psig at the end of the 95° C. hold.

e) The reactor was cooled to at least 30° C. Ethylene oxide was then charged to the reactor. The reactor pressure was approximately 93 psig after the ethylene oxide charge.

f) The temperature was raised to 95° C. and maintained at this level for 30 minutes. The pressure was approximately 270 psig at the end of the 95° C. hold.

g) The reactor was cooled to 25° C. During cooling the reactor was also vented to atmospheric pressure. Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Sample B3

Sample B3 was prepared in the same manner as Sample B1, except that after raising the temperature of the contents to 95° C. in step d), there was no temperature hold prior to the cooling in step e).

Preparation of Sample B4

Sample B4 was prepared in the same manner as Sample B1, except that the contents were cooled to 50° C. in step e).

Preparation of Sample B5

Sample B5 was prepared in the same manner as Sample B1, except that the contents were cooled to 70° C. in step e).

Preparation of Samples B10 and B12 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.
b) Under agitation, with the reactor at 25° C., a first quantity of dimethyl ether was charged to the reactor over 5 minutes. The pressure in the reactor was approximately 70 psig at the end of the dimethyl ether charge.
c) Next, methyl chloride was charged to the reactor over 10 minutes. The pressure in the reactor was approximately 73 psig at the end of the methyl chloride charge. Next, a second quantity of dimethyl ether was charged to the reactor over 5 minutes. The pressure was approximately 78 psig at the end of the dimethyl ether charge. A first quantity of 50% aqueous sodium hydroxide was charged to the reactor over 15 minutes. The temperature was raised to 85° C. A second quantity of 50% aqueous sodium hydroxide was charged to the reactor. The pressure was approximately 80 psig following the 50% aqueous sodium hydroxide charge.
d) The temperature was raised to 95° C. and maintained at this level for 30 minutes. The pressure was approximately 267 psig at the end of the 95° C. hold.
e) Ethylene oxide was charged to the reactor. The reactor pressure was approximately 93 psig after the ethylene oxide charge.
f) The temperature was maintained at 95° C. for 30 minutes. The pressure was approximately 270 psig at the end of the 95° C. hold.
g) The reactor was cooled to 25° C. During cooling the reactor was also vented to atmospheric pressure. Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Samples B11 and B14 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.
b) Under agitation, with the reactor at 25° C., a first quantity of dimethyl ether was charged to the reactor over 5 minutes. The pressure in the reactor was approximately 70 psig at the end of the dimethyl ether charge.
c) Next, methyl chloride was charged to the reactor over 10 minutes. The pressure in the reactor was approximately 73 psig at the end of the methyl chloride charge. Next, a second quantity of dimethyl ether was charged to the reactor over 5 minutes. The pressure was approximately 78 psig at the end of the dimethyl ether charge. A first quantity of 50% aqueous sodium hydroxide was charged to the reactor over 15 minutes. The temperature was raised to 85° C. A second quantity of 50% aqueous sodium hydroxide was charged to the reactor. The pressure was approximately 80 psig following the 50% aqueous sodium hydroxide charge.
d) The temperature was raised to 95° C. and maintained at this level for 30 minutes. The pressure was approximately 267 psig at the end of the 95° C. hold.
e) The reactor was cooled to at least 30° C. Ethylene oxide was then charged to the reactor. The reactor pressure was approximately 93 psig after the ethylene oxide charge.
f) The temperature was raised to 95° C. and maintained at this level for 30 minutes. The pressure was approximately 270 psig at the end of the 95° C. hold.
g) The reactor was cooled to at least 30° C. During cooling the reactor was also vented to atmospheric pressure. Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Sample B13

Sample B13 was prepared in the same manner as Sample B1, except that the contents were cooled to 60° C. in step e) and the hold period in step d) was 30 minutes. Also, following step c), and before step d), the temperature was raised to 85° C. and a second quantity of 50% aqueous sodium hydroxide was charged to the reactor over 5 minutes.

Preparation of Samples B15-B16

Samples B15-B16 were prepared in the same manner as Sample B1, except that the hold period in step d) was 30 minutes.

Preparation of Samples B17-B18

Samples B17-B18 were prepared in the same manner as Sample B1, except that the hold period in step d) was 30 minutes.

Sample Measurements

Each of the obtained Samples B1-B20 was subjected to testing for: % unsubstituted AGU, methyl DS, Hydroxyethyl (HE) MS, enzyme unsubstituted wt %, and % blockiness, in the same manner as described in Example A.

The obtained Samples B1-B20 were used in the preparation of tile cement mortar samples (as described above). The resulting tile cement mortars were subjected to at least some of the physical testing described above. The results of all of such testing are shown in Tables 5 and 6 below.

TABLE 6

| Sample No. | 3 Day Tensile Strength, N/mm$^2$ | 7 Day Tensile Strength, N/mm$^2$ |
|---|---|---|
| B1  | 1.0 | 0.9 |
| B2  | 1.0 | 1.1 |
| B4  | 0.9 | 0.9 |
| B10 | 1.0 | 1.1 |
| B11 | 0.9 | 0.9 |
| B12 | 0.9 | 0.9 |
| B14 | 0.9 | 0.9 |
| B15 | 1.1 | 1.1 |
| B16 | 1.1 | 1.2 |
| B17 | 1.1 | 1.0 |
| B18 | 1.2 | 1.1 |
| B19 | 0.6 | 0.7 |
| B20 | —   | 0.8 |

In addition, FIG. 1 shows a comparison of setting time vs. % blockiness for Samples B1, B2, B10, B15 and B18 and Control Samples A9-A11. These samples were selected because of their similarity in methyl DS and HE MS. As can be seen in FIG. 1, the setting time and % blockiness values are much lower for Samples B1, B2, B10, B15 and B18 as compared to Control Samples A9-A11.

Figure 2:
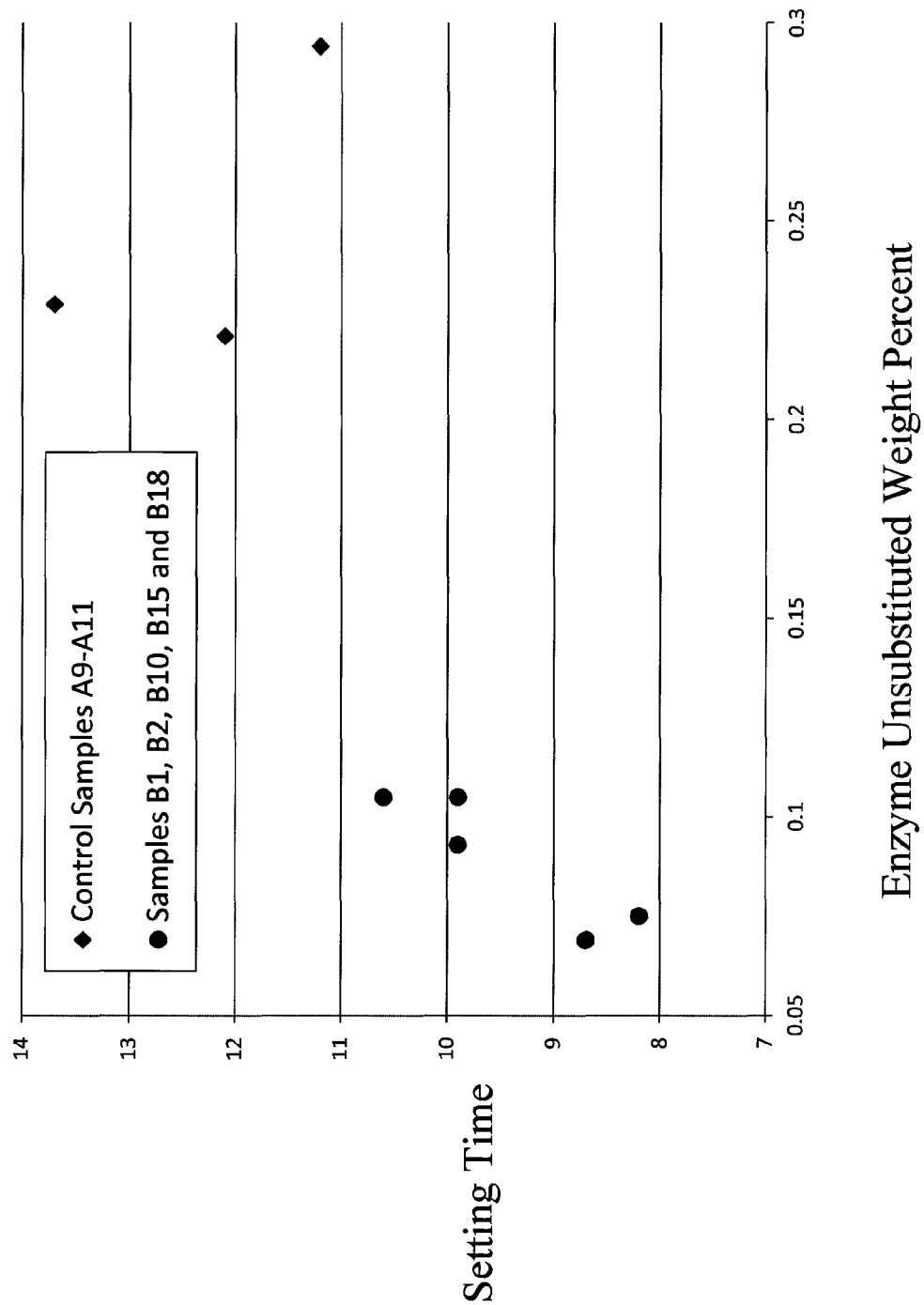
FIG. 2 is a plot showing setting time vs. enzyme unsubstituted weight % for Control Samples A9-A11 and Samples B1, B2, B10, B15 and B18.

Similarly, FIG. 2 shows a comparison of setting time vs. enzyme unsubstituted wt % for Samples B1, B2, B10, B15 and B18 and Control Samples A9-A11. As can be seen in FIG. 2, the setting time and enzyme unsubstituted wt % values are much lower for Samples B1, B2, B10, B15 and B18 as compared to Control Samples A9-A11.

Figure 3:
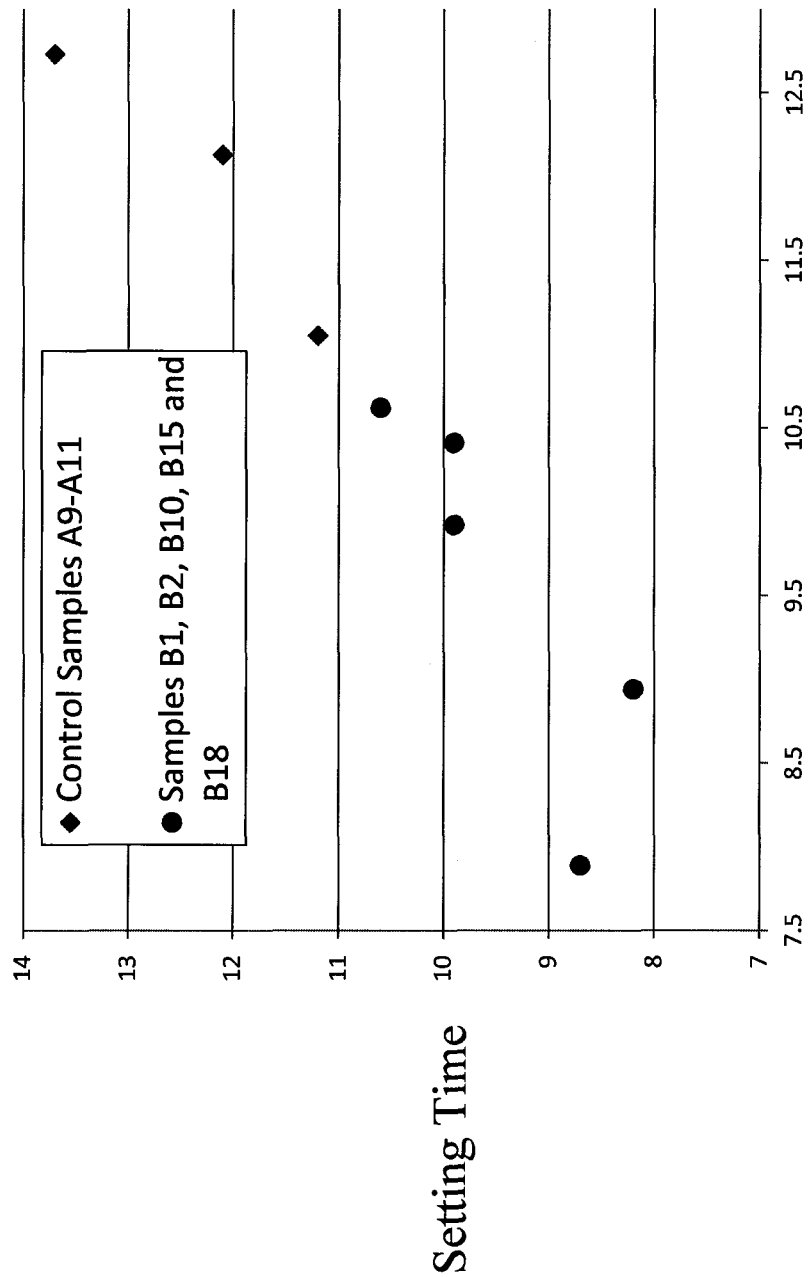
FIG. 3 is a plot showing setting time vs. % unsubstituted AGU for Control Samples A9-A11 and Samples B1, B2, B10, B15 and B18.

Similarly, FIG. 3 shows a comparison of setting time vs. % unsubstituted AGU for Samples B1, B2, B10, B15 and B18 and Control Samples A9-A11. As can be seen in FIG. 3, the setting time and % unsubstituted AGU values are much lower for Samples B1, B2, B10, B15 and B18 as compared to Control Samples A9-A11.

TABLE 5

| Sample No. | % Unsub AGU | Methyl DS | HE MS | Enzyme Unsub wt % | % Blockiness | Setting Time Average h | 24-Hour Tensile Strength (average) N/mm$^2$ |
|---|---|---|---|---|---|---|---|
| B1  | 7.89  | 1.71 | 0.06 | 0.069 | 1.18  | 8.7  | 0.75 |
| B2  | 8.94  | 1.69 | 0.08 | 0.075 | 1.170 | 8.2  | 0.8  |
| B3  | 9.94  | 1.71 | 0.11 | 0.132 | 1.800 | 10.0 | 0.7  |
| B4  | 9.77  | 1.74 | 0.07 | 0.061 | 0.790 | 10.1 | 0.7  |
| B5  | 9.75  | 1.66 | 0.07 | 0.061 | 0.750 | 9.9  | 0.7  |
| B6  | 9.49  | 1.80 | 0.07 | 0.132 | 2.084 | 10.0 | 0.8  |
| B7  | 8.54  | 1.73 | 0.06 | 0.081 | 1.355 | 9.9  | 0.7  |
| B8  | 8.70  | 1.79 | 0.07 | 0.082 | 1.459 | 10.2 | 0.7  |
| B9  | 9.16  | 1.78 | 0.07 | 0.070 | 0.981 | 10.8 | 0.7  |
| B10 | 9.92  | 1.72 | 0.07 | 0.105 | 1.506 | 9.9  | 0.7  |
| B11 | 9.19  | 1.76 | 0.07 | 0.054 | 0.799 | 8.4  | 0.7  |
| B12 | 10.42 | 1.74 | 0.08 | 0.082 | 1.243 | 10.0 | 0.7  |
| B13 | 8.46  | 1.77 | 0.08 | 0.041 | 0.728 | 9.7  | 0.8  |
| B14 | 8.51  | 1.75 | 0.07 | 0.047 | 0.841 | 9.7  | 0.7  |
| B15 | 10.41 | 1.70 | 0.08 | 0.093 | 1.485 | 9.9  | 0.6  |
| B16 | 9.19  | 1.77 | 0.10 | 0.059 | 1.221 | 9.5  | 0.6  |
| B17 | 10.58 | 1.66 | 0.07 | 0.081 | 1.289 | 10.7 | 0.6  |
| B18 | 10.62 | 1.68 | 0.07 | 0.105 | 1.472 | 10.6 | 0.6  |
| B19 | 9.28  | 1.76 | 0.07 | 0.070 | 1.260 | 9.6  | 0.7  |
| B20 | 9.60  | 1.76 | 0.07 | 0.059 | 0.898 | 10.2 | 0.6  |

Example C (Samples C1-C13

High Solids Process, No Venting

Reagent quantities used in the preparation of Samples C1-C13 are shown in Table 7 below.

TABLE 7

| Sample No. | MeCl (g) | EO (g) | 50% NaOH (g) | 1st DME (g) | 2nd DME (g) | % Solids |
|---|---|---|---|---|---|---|
| C1 | 231.20 | 16.10 | 283.40 | 83.20 | 82.90 | 17.7 |
| C2 | 227.90 | 8.10 | 282.00 | 83.80 | 84.90 | 17.9 |
| C3 | 253.90 | 8.00 | 319.60 | 86.80 | 82.70 | 16.6 |
| C4 | 250.90 | 16.00 | 318.20 | 151.20 | 32.10 | 16.3 |
| C5 | 262.10 | 20.00 | 326.40 | 85.30 | 84.80 | 16.2 |
| C6 | 249.40 | 16.00 | 316.20 | 85.50 | 86.60 | 16.6 |
| C7 | 251.80 | 16.00 | 318.20 | 82.00 | 83.00 | 16.6 |
| C8 | 251.10 | 16.00 | 319.00 | 85.30 | 82.30 | 16.6 |
| C9 | 240.50 | 16.00 | 301.40 | 84.10 | 86.90 | 17.1 |
| C10 | 211.30 | 30.00 | 268.40 | 82.10 | 84.90 | 18.1 |
| C11 | 252.00 | 16.10 | 319.80 | 83.20 | 84.60 | 16.6 |
| C12 | 253.90 | 15.90 | 316.20 | 82.20 | 84.30 | 16.6 |
| C13 | 250.70 | 15.80 | 312.60 | 84.60 | 83.30 | 16.7 |

Preparation of Samples C1-C5 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.

b) Under agitation, with the reactor at 25° C., a first quantity of dimethyl ether was charged to the reactor over 5 minutes. The pressure in the reactor was approximately 57 psig at the end of the dimethyl ether charge.

c) Next, methyl chloride was charged to the reactor over 10 minutes. The pressure in the reactor was approximately 77 psig at the end of the methyl chloride charge. Next, a second quantity of dimethyl ether was charged to the reactor over 5 minutes. The pressure was approximately 78 psig at the end of the dimethyl ether charge. A quantity of 50% aqueous sodium hydroxide was charged to the reactor over 10 minutes. The pressure was approximately 82 psig following the sodium hydroxide charge.

d) The temperature was raised to 70° C. and maintained at this level for 20 minutes (26 minutes for Sample C2). The pressure was approximately 222 psig at the end of the 70° C. hold.

e) Ethylene oxide was charged to the reactor. The reactor pressure was approximately 228 psig after the ethylene oxide charge.

f) The temperature was raised to 95° C. and maintained at this level for 30 minutes. The pressure was approximately 296 psig at the end of the 95° C. hold.

g) The reactor was cooled to 25° C. During cooling the reactor was also vented to atmospheric pressure. Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Sample C6

Sample C6 was prepared in the same manner as Sample C1, except that the hold period in step d) was 10 minutes; and the hold period in step f) was 45 minutes.

Preparation of Sample C7

Sample C7 was prepared in the same manner as Sample C1, except that the hold period in step d) was 5 minutes; and the hold period in step f) was 50 minutes.

Preparation of Samples C8 and C9

Samples C8 and C9 were prepared in the same manner as Sample C1, except that there was no hold period in step d); and the hold period in step f) was 55 minutes.

Preparation of Samples C10 and C11

Samples C10 and C11 were prepared in the same manner as Sample C1, except that the temperature in step d) was 65° C.; there was no hold period in step d); and the hold period in step f) was 55 minutes.

Preparation of Samples C12 and C13

Samples C12 and C13 were prepared in the same manner as Sample C1, except that the temperature in step d) was 60° C.; there was no hold period in step d); and the hold period in step f) was 55 minutes.

Sample Measurements

Each of the obtained Samples C1-C13 was subjected to testing for: % unsubstituted AGU, methyl DS, HE MS, enzyme unsubstituted wt %, and % blockiness, in the same manner as described in Example A.

The obtained Samples C1-C13 were used in the preparation of tile cement mortar samples (as described above). The resulting tile cement mortars were subjected to at least some of the physical testing described above. The results of all of such testing are shown in Tables 8 and 9 below.

TABLE 8

| Sample No. | % Unsub AGU | Methyl DS | HE MS | Enzyme Unsub wt % | % Blockiness | Setting Time (Average) (h) | 24 Hour Tensile Strength (Average) (N/mm$^2$) |
|---|---|---|---|---|---|---|---|
| C1 | 11.10 | 1.69 | 0.12 | 0.083 | 0.998 | 11.2 | 0.6 |
| C2 | 11.16 | 1.73 | 0.09 | 0.120 | 1.388 | 11.8 | 0.6 |
| C3 | 10.97 | 1.81 | 0.08 | 0.130 | 1.542 | 11.7 | 0.6 |
| C4 | 9.86 | 1.81 | 0.11 | 0.093 | 1.346 | 10.9 | 0.6 |
| C5 | 9.12 | 1.86 | 0.13 | 0.082 | 1.261 | 9.8 | 0.6 |
| C6 | 9.12 | 1.76 | 0.12 | 0.044 | 1.161 | 9.9 | 0.7 |
| C7 | 8.90 | 1.82 | 0.13 | 0.053 | 1.347 | 10.0 | 0.6 |
| C8 | 8.73 | 1.84 | 0.14 | 0.040 | 0.686 | 10.4 | 0.7 |
| C9 | 9.97 | 1.84 | 0.13 | 0.042 | 0.660 | 10.0 | 0.8 |
| C10 | 9.82 | 1.75 | 0.14 | 0.060 | 1.301 | 10.4 | 0.7 |
| C11 | 9.16 | 1.79 | 0.14 | 0.057 | 0.856 | 10.3 | 0.7 |
| C12 | 9.34 | 1.82 | 0.15 | 0.088 | 1.422 | 10.7 | 0.77 |
| C13 | 9.67 | 1.77 | 0.15 | 0.084 | 1.366 | 10.4 | 0.8 |

TABLE 9

| Sample No. | 3 Day Tensile Strength, N/mm$^2$ | 7 Day Tensile Strength, N/mm$^2$ |
|---|---|---|
| C5 | 1.0 | 1.0 |
| C6 | 1.0 | 1.0 |
| C7 | 1.2 | 1.0 |
| C8 | 1.0 | 1.1 |
| C9 | 1.1 | 0.9 |
| C10 | 0.9 | 1.0 |
| C11 | 0.9 | 1.1 |
| C12 | 1.1 | 1.1 |
| C13 | 1.1 | 1.0 |

Example D (Samples D1-D16)

Slurry Process, No Venting, 70° C. Alkylation

Reagent quantities used in the preparation of Samples D1-D16 are shown in Table 10 below.

TABLE 10

| Sample No. | Cellulose (g) | MeCl (g) | EO (g) | 50% NaOH (g) | Heptane (g) | % Solids |
|---|---|---|---|---|---|---|
| D1 | 73.50 | 78.00 | 13.90 | 131.80 | 659 | 7.7 |
| D2 | 73.50 | 77.40 | 13.20 | 131.70 | 659 | 7.7 |
| D3 | 73.59 | 82.10 | 14.60 | 139.60 | 659 | 7.6 |
| D4 | 73.54 | 81.90 | 27.40 | 139.50 | 660 | 7.5 |
| D5 | 73.50 | 77.60 | 13.10 | 131.80 | 659 | 7.7 |
| D6 | 73.51 | 77.60 | 13.10 | 132.00 | 659 | 7.7 |
| D7 | 73.53 | 81.40 | 19.40 | 139.44 | 659 | 7.6 |
| D8 | 73.54 | 82.20 | 13.20 | 139.60 | 659 | 7.6 |
| D9 | 73.54 | 81.90 | 27.30 | 139.40 | 659 | 7.5 |
| D10 | 73.55 | 82.30 | 19.90 | 139.10 | 659 | 7.6 |
| D11 | 73.54 | 77.40 | 13.90 | 131.90 | 659 | 7.7 |
| D12 | 73.54 | 77.80 | 12.90 | 131.90 | 659 | 7.7 |
| D13 | 73.56 | 77.60 | 14.40 | 131.60 | 659 | 7.7 |
| D14 | 73.50 | 82.70 | 14.60 | 140.70 | 659 | 7.6 |
| D15 | 73.50 | 83.20 | 14.50 | 140.60 | 659 | 7.6 |
| D16 | 73.50 | 82.50 | 13.90 | 140.40 | 659 | 7.6 |

Preparation of Samples D1-D16 a) A slurry containing ground cellulose pulp and heptane was charged to a 1.5 L vertical reactor. The air was carefully replaced by nitrogen followed by nitrogen pressurization to 105 psig. Vacuum was applied to the system to provide 28 inches of reduced pressure. The reduced pressure was maintained for 1 minute. Pressurization followed by vacuum purging was repeated. The reactor was then pressurized to 15 psig with nitrogen.

b) Under agitation, a quantity of 50% aqueous sodium hydroxide was charged to the reactor at 18° C. over 13 minutes. Vacuum was applied to the system to provide 28 inches of reduced pressure. The reduced pressure was maintained for 1 minute. The reactor was pressurized to 15 psig with nitrogen. Vacuum purging followed by pressurization to 15 psig was repeated four more times.

c) Methyl chloride was then charged over 20 minutes. The pressure in the reactor was approximately 25 psig following the methyl chloride addition.

d) The temperature was raised to 70° C. and maintained at this level for 1 hour. The pressure was approximately 54 psig at the end of the 70° C. hold.

e) The temperature was then reduced to 40° C. The pressure in the reactor was approximately 27 psig. Ethylene oxide was then charged over 4.7 minutes. The pressure after the EO addition was approximately 42 psig.

f) The temperature was raised to 60° C. and maintained at this level for 30 minutes. The temperature was then raised to 105° C. The pressure was 75 psig. The temperature was maintained at 105° C. for 2 hours.

g) The reactor was cooled to 40° C. The pressure in the reactor was 25 psig. The content of the reactor was filtered and the wet cake was subjected to a series of hot water washes while adjusting to neutral pH. After drying and milling a methylhydroxyethyl cellulose ether was obtained.

Sample Measurements

Each of the obtained Samples D1-D16 was subjected to testing for: % unsubstituted AGU, methyl DS, and HE MS, in the same manner as described in Example A.

The obtained Samples D1-D16 were used in the preparation of tile cement mortar samples (as described above). The resulting tile cement mortars were subjected to at least some of the physical testing described above. The results of all of such testing are shown in Table 11 below.

TABLE 11

| Sample No. | % Unsub AGU | Methyl DS | HE MS | Enzyme Unsub % wt | % Blockiness | Setting Time Average (h) | 24-Hour Tensile Strength (Average) (N/mm²) |
|---|---|---|---|---|---|---|---|
| D1 | 9.08 | 1.79 | 0.18 | 0.081 | 1.190 | 8.9 | 0.68 |
| D2 | 11.62 | 1.72 | 0.17 | 0.067 | 1.022 | 11.0 | 0.65 |
| D3 | 9.59 | 1.76 | 0.19 | 0.068 | 0.945 | 9.2 | 0.70 |
| D4 | 9.96 | 1.94 | 0.26 | 0.028 | 0.631 | 9.0 | 0.60 |
| D5 | 13.01 | 1.71 | 0.21 | 0.084 | 1.060 | 15.3 | 0.60 |
| D6 | 9.69 | 1.76 | 0.18 | 0.033 | 0.597 | 9.8 | 0.60 |
| D7 | 10.24 | 1.86 | 0.20 | 0.072 | 2.520 | 10.5 | 0.60 |
| D8 | 10.49 | 1.82 | 0.19 | 0.103 | 1.302 | 9.8 | 0.70 |
| D9 | 10.15 | 1.87 | 0.24 | 0.076 | 1.974 | 10.2 | 0.60 |
| D10 | 9.83 | 1.80 | 0.20 | 0.046 | 0.953 | 9.2 | 0.70 |
| D11 | 9.25 | 1.83 | 0.16 | 0.060 | 2.120 | 8.3 | 0.60 |
| D12 | 10.36 | 1.81 | 0.17 | 0.042 | 0.766 | 10.3 | 0.60 |
| D13 | 11.48 | 1.82 | 0.20 | 0.059 | 0.925 | 11.1 | 0.60 |
| D14 | 9.07 | 1.87 | 0.18 | 0.045 | 1.111 | 11.5 | 0.60 |
| D15 | 8.99 | 1.75 | 0.16 | 0.028 | 0.591 | 13.4 | 0.60 |
| D16 | 9.71 | 1.75 | 0.17 | 0.072 | 1.546 | 10.4 | 0.60 |

Example E (Samples E1-E2)

Slurry Process, No Venting, 87° C. Alkylation

Reagent quantities used in the preparation of Samples E1-E2 are shown in Table 12 below.

TABLE 12

| Sample No. | Cellulose (g) | MeCl (g) | EO (g) | 50% NaOH (g) | Heptane (g) | % Solids |
|---|---|---|---|---|---|---|
| E1 | 73.54 | 77.40 | 14.60 | 131.40 | 659 | 7.7 |
| E2 | 73.56 | 76.70 | 13.00 | 132.00 | 659 | 7.7 |

Preparation of Samples E1 and E2 a) A slurry containing ground cellulose pulp and heptane were charged to a 1.5 L vertical reactor. The air was carefully replaced by nitrogen followed by nitrogen pressurization to 105 psig. Vacuum was applied to the system to provide 28 inches of reduced pressure. The reduced pressure was maintained for 1 minute. Pressurization followed by vacuum purging was repeated. The reactor was then pressurized to 15 psig with nitrogen.
b) Under agitation, a quantity of 50% aqueous sodium hydroxide was charged to the reactor at 18° C. over 13 minutes. Vacuum was applied to the system to provide 28 inches of reduced pressure. The reduced pressure was maintained for 1 minute. The reactor was pressurized to 15 psig with nitrogen. Vacuum purging followed by pressurization to 15 psig was repeated four more times.
c) Methyl chloride was then charged over 20 minutes. The pressure in the reactor was approximately 25 psig following the methyl chloride addition.
d) The temperature was raised to 87° C. and maintained at this level for 1 hour. The pressure was approximately 54 psig at the end of the 87° C. hold.
e) The temperature was then reduced to 40° C. The pressure in the reactor was approximately 27 psig. Ethylene oxide was then charged over 4.7 minutes. The pressure after the EO addition was approximately 42 psig.
f) The temperature was raised to 60° C. and maintained at this level for 30 minutes. The temperature was then raised to 105° C. The pressure was 75 psig. The temperature was maintained at 105° C. for 2 hours.
g) The reactor was cooled to 40° C. The pressure in the reactor was 25 psig. The content of the reactor was filtered and the wet cake was subjected to a series of hot water washes while adjusting to neutral pH. After drying and milling, a methylhydroxyethyl cellulose ether was obtained.

Sample Measurements

Each of the obtained Samples E1-E2 was subjected to testing for: % unsubstituted AGU, methyl DS, and HE MS, in the same manner as described in Example A.

The obtained Samples E1-E2 were used in the preparation of tile cement mortar samples (as described above). The resulting tile cement mortars were subjected to at least some of the physical testing described above. The results of all of such testing are shown in Table 13 below.

TABLE 13

| Sample No. | % Unsub AGU | Methyl DS | HE MS | Enzyme Unsub % wt | % Blockiness | Setting Time Average (h) | 24-Hour Tensile Strength (Average) (N/mm²) |
|---|---|---|---|---|---|---|---|
| E1 | 11.42 | 1.74 | 0.11 | 0.058 | 1.021 | 11.7 | 0.60 |
| E2 | 11.15 | 1.72 | 0.12 | 0.066 | 1.083 | 13.4 | 0.70 |

Example F (Samples F1-F19)

Slurry Process, No Venting, 105° C. Alkylation

Reagent quantities used in the preparation of Samples F1-F19 are shown in Table 14 below.

TABLE 14

| Sample No. | Cellulose (g) | MeCl (g) | EO (g) | 50% NaOH (g) | Heptane (g) | % Solids |
|---|---|---|---|---|---|---|
| F1 | 73.54 | 77.50 | 13.40 | 132.00 | 659 | 7.7 |
| F2 | 73.55 | 77.70 | 13.20 | 132.00 | 659 | 7.7 |
| F3 | 73.53 | 68.80 | 9.80 | 117.20 | 659 | 7.9 |
| F4 | 73.51 | 69.70 | 11.10 | 117.30 | 659 | 7.9 |
| F5 | 73.51 | 69.40 | 10.40 | 117.00 | 659 | 7.9 |
| F6 | 73.51 | 61.80 | 6.90 | 104.70 | 659 | 8.1 |
| F7 | 73.52 | 61.70 | 6.70 | 104.40 | 659 | 8.1 |
| F8 | 73.56 | 90.60 | 13.40 | 153.40 | 659 | 7.4 |
| F9 | 73.50 | 99.70 | 13.40 | 172.20 | 659 | 7.2 |
| F10 | 73.52 | 95.30 | 13.00 | 164.30 | 659 | 7.3 |
| F11 | 73.51 | 95.10 | 8.50 | 162.70 | 659 | 7.4 |
| F12 | 73.50 | 91.10 | 5.90 | 153.30 | 659 | 7.5 |
| F13 | 73.52 | 99.30 | 6.80 | 170.90 | 659 | 7.3 |
| F14 | 73.50 | 100.10 | 9.50 | 171.80 | 659 | 7.2 |
| F15 | 73.50 | 100.50 | 9.00 | 170.30 | 659 | 7.3 |
| F16 | 73.51 | 100.00 | 13.20 | 171.20 | 659 | 7.2 |
| F17 | 73.50 | 100.20 | 13.20 | 170.20 | 659 | 7.2 |
| F18 | 73.50 | 100.10 | 13.30 | 171.40 | 659 | 7.2 |
| F19 | 73.51 | 99.60 | 13.20 | 170.90 | 659 | 7.2 |

Preparation of Samples F1-F19 a) A slurry containing ground cellulose pulp and heptane was charged to a 1.5 L vertical reactor. The air was carefully replaced by nitrogen followed by nitrogen pressurization to 105 psig. Vacuum was applied to the system to provide 28 inches of reduced pressure. The reduced pressure was maintained for 1 minute. Pressurization followed by vacuum purging was repeated. The reactor was then pressurized to 15 psig with nitrogen.

b) Under agitation, a quantity of 50% aqueous sodium hydroxide was charged to the reactor at 20° C. over 12 minutes. Vacuum was applied to the system to provide 28 inches of reduced pressure. The reduced pressure was maintained for 1 minute. The reactor was pressurized to 15 psig with nitrogen. Vacuum purging followed by pressurization to 15 psig was repeated four more times.

c) Methyl chloride was then charged over 18 minutes. The pressure in the reactor was approximately 31 psig following the methyl chloride addition.

d) The temperature was raised to 105° C. and maintained at this level for 1 hour. The pressure was approximately 75 psig at the end of the 105° C. hold.

e) The temperature was then reduced to 40° C. The pressure was approximately 27 psig. Ethylene oxide was then charged over 4.0 minutes. The pressure after the EO addition was approximately 30 psig.

f) The temperature was raised to 60° C. and maintained at this level for 30 minutes. The pressure was approximately 40 psig. The temperature was raised to 105° C. The pressure was 72 psig. The temperature was maintained at 105° C. for 2 hours.

g) The reactor was cooled to 40° C. The content of the reactor was filtered and the wet cake was subjected to a series of hot water washes while adjusting to neutral pH. After drying and milling a methylhydroxyethyl cellulose ether was obtained.

Sample Measurements

Each of the obtained Samples F1-F19 was subjected to testing for: % unsubstituted AGU, methyl DS, and HE MS, in the same manner as described in Example A.

The obtained Samples F1-F19 were used in the preparation of tile cement mortar samples (as described above). The resulting tile cement mortars were subjected to at least some of the physical testing described above. The results of all of such testing are shown in Table 15 below.

TABLE 15

| Sample No. | % Unsub AGU | Methyl DS | HE MS | Enzyme Unsub % wt | % Blockiness | Setting Time Average (h) | 24-Hour Tensile Strength (Average) (N/mm$^2$) |
|---|---|---|---|---|---|---|---|
| F1 | 9.23 | 1.75 | 0.08 | 0.030 | 0.632 | 8.7 | 0.65 |
| F2 | 8.91 | 1.70 | 0.08 | 0.044 | 0.933 | 8.5 | 0.50 |
| F3 | 9.36 | 1.67 | 0.08 | 0.021 | 0.451 | 9.3 | 0.60 |
| F4 | 9.17 | 1.65 | 0.08 | 0.018 | 0.402 | 8.6 | 0.90 |
| F5 | 9.74 | 1.63 | 0.09 | 0.026 | 0.460 | 9.1 | 0.70 |
| F6 | 10.65 | 1.59 | 0.09 | 0.031 | 0.538 | 10.6 | 0.70 |
| F7 | 11.04 | 1.62 | 0.07 | 0.032 | 0.498 | 11.3 | 0.70 |
| F8 | 7.86 | 1.74 | 0.07 | 0.020 | 0.478 | 8.1 | 0.60 |
| F9 | 6.84 | 1.81 | 0.07 | 0.015 | 0.398 | 6.3 | 0.63 |
| F10 | 8.41 | 1.82 | 0.08 | 0.037 | 0.893 | 8.2 | 0.70 |
| F11 | 8.00 | 1.77 | 0.07 | 0.029 | 0.645 | 7.0 | 0.50 |
| F12 | 7.71 | 1.70 | 0.06 | 0.018 | 0.449 | 7.8 | 0.75 |
| F13 | 7.67 | 1.75 | 0.06 | 0.030 | 0.741 | 7.0 | 0.50 |
| F14 | 7.03 | 1.82 | 0.06 | 0.019 | 0.728 | 8.6 | 0.65 |
| F15 | 8.65 | 1.77 | 0.05 | 0.083 | 1.519 | 10.3 | 0.60 |
| F16 | 6.68 | 1.77 | 0.06 | 0.015 | 0.582 | 8.1 | 0.70 |
| F17 | 7.29 | 1.82 | 0.07 | 0.052 | 1.393 | 8.7 | 0.70 |
| F18 | 9.03 | 1.74 | 0.06 | 0.147 | 3.024 | 12.3 | 0.60 |
| F19 | 8.69 | 1.73 | 0.07 | 0.104 | 2.395 | 11.1 | 0.60 |

Example G

Preparation Procedure for Slurry Examples PS1-PS13

Reagent quantities used in the preparation of Slurry Samples PS1-PS13 are shown in Table 16 below.

TABLE 16

| Sample No. | Cellulose (g) | Heptane (g) | MeCl (g) | EO (g) | 50% NaOH (g) | % Solids |
|---|---|---|---|---|---|---|
| PS1 | 91.88 | 823.8 | 96.1 | 18.2 | 164.7 | 7.7 |
| PS2 | 91.88 | 823.8 | 132.9 | 17.7 | 228.3 | 7.1 |
| PS3 | 91.88 | 823.8 | 124.8 | 16.3 | 213.5 | 7.2 |
| PS4 | 73.50 | 658.5 | 108.5 | 14.5 | 182.1 | 7.1 |
| PS5 | 91.88 | 823.8 | 124.9 | 16.1 | 214.0 | 7.2 |
| PS6 | 73.50 | 658.5 | 92.0 | 13.7 | 156.8 | 7.4 |
| PS7 | 91.88 | 823.8 | 125.1 | 16.3 | 215.7 | 7.2 |
| PS8 | 73.50 | 658.5 | 107.1 | 14.2 | 179.4 | 7.1 |
| PS9 | 73.50 | 658.5 | 106.9 | 14.5 | 181.5 | 7.1 |
| PS10 | 91.88 | 824.2 | 124.8 | 17.2 | 214.1 | 7.2 |
| PS11 | 73.50 | 658.5 | 106.6 | 14.1 | 181.3 | 7.1 |
| PS12 | 91.88 | 823.8 | 125.00 | 16.6 | 214.0 | 7.2 |
| PS13 | 73.50 | 658.5 | 105.3 | 15.3 | 180.0 | 7.1 |

Preparation of Samples PS1-PS3 a) A slurry containing ground cellulose pulp and heptane was charged to a vertical reactor. The air was carefully replaced by nitrogen followed by nitrogen pressurization to 105 psig. Vacuum was applied to the system to provide 28 inches of reduced pressure. The reduced pressure was maintained for 1 minute. Pressurization followed by vacuum purging was repeated. The reactor was then pressurized to 15 psig with nitrogen.

b) Under agitation, aqueous 50% sodium hydroxide was charged to the reactor at a temperature above 10° C. Vacuum was applied to the system to provide 28 inches of reduced pressure. The reduced pressure was maintained for 1 minute. The reactor was pressurized to 15 psig with nitrogen. Vacuum purging followed by pressurization to 15 psig was repeated four more times.

c) Methyl chloride was charged to the reactor.

d) The temperature was raised to 87° C.

e) The temperature was reduced to 40° C. Ethylene oxide was charged to the reactor.

f) The temperature was raised to 60° C. and maintained at this level for 30 minutes. The temperature was raised to 105° C. The temperature was maintained at 105° C. for 2 hours.

g) The reactor was cooled to 40° C. The contents of the reactor were filtered and the wet cake was subjected to a series of hot water washes while adjusting to neutral pH. After drying and milling a methylhydroxyethyl cellulose ether was obtained.

Preparation of Samples PS4-PS6

Samples PS4-PS6 were prepared in the same manner as Samples PS1-PS3, except that the temperature in step d) was 80° C.

Preparation of Sample PS7

Sample PS7 was prepared in the same manner as Samples PS1-PS3, except that the temperature in step d) was 70° C.

Preparation of Sample PS8

Sample PS8 was prepared in the same manner as Samples PS1-PS3, except that the temperature in step d) was 65° C.

Preparation of Samples PS9-PS10

Samples PS9-PS10 were prepared in the same manner as Sample PS8, except that the temperature in step d) was maintained for 30 minutes.

Preparation of Samples PS11-PS13

Samples PS11 were prepared in the same manner as Samples PS1-PS3, except that the temperature in step d) was 60° C. and maintained at 60° C. for 30 minutes. Samples P12-13 were prepared in the same manner as Samples PS1-PS3, except that the temperature in step d) was 60° C.

Samples PS1-PS13 were subjected to testing as described in Example A above. The results of testing are shown in Table 16 below.

Example H

Preparation Procedure for High Solids Examples PD1-PD6

Reagent quantities used in the preparation of high solids Samples PD1-PD6 are shown in Table 17 below.

TABLE 17

| Sample No. | MeCl (g) | EO (g) | 50% NaOH (g) | Total DME (g) | % Solids |
|---|---|---|---|---|---|
| PD1 | 265.6 | 16.00 | 327.4 | 177.9 | 16.0 |
| PD2 | 260.2 | 16.00 | 325.0 | 176.2 | 16.2 |
| PD3 | 261.3 | 16.00 | 325.6 | 178.6 | 16.1 |
| PD4 | 261.6 | 16.00 | 327.2 | 177.9 | 16.1 |
| PD5 | 251.3 | 16.00 | 317.8 | 174.1 | 16.5 |
| PD6 | 255.6 | 16.00 | 317.8 | 172.0 | 16.5 |

Preparation of Sample PD1 a) A 150 g quantity of ground cellulose was charged to a 2.5 L horizontal high-solids reactor equipped with a horizontally-mounted plow-type agitator. The air was carefully replaced with nitrogen, followed by nitrogen pressurization to 300 psig. Vacuum was applied to the system to provide 28 inches of reduced pressure. The reduced pressure was held for 1 minute. The reactor was then pressurized to 20 psig with nitrogen. Vacuum purging followed by nitrogen pressurization was repeated.

b) Under agitation, with the reactor at 25° C., dimethyl ether was charged to the reactor over 5 minutes.

c) Next, methyl chloride was charged to the reactor over 10 minutes. Next, additional dimethyl ether was charged to the reactor over 5 minutes. A quantity of 50% aqueous sodium hydroxide was charged to the reactor over 10 minutes.

d) The temperature was raised to 60° C. and maintained at this level for 15 minutes.

e) Ethylene oxide was then charged to the reactor.

f) The temperature was raised to 95° C. and maintained at this level for 45 minutes.

g) The reactor was cooled to 25° C. During cooling the reactor was also vented to atmospheric pressure.

Vacuum was then applied to provide 28 inches of reduced pressure. The reduced pressure was held for one minute. The reactor was then pressurized to 5 psig with nitrogen. Vacuum purging followed by nitrogen pressurization was repeated 3 times. The reactor was vented to atmospheric pressure and the contents removed. The wet cake was subjected to a series of hot water washes while adjusting to neutral pH. After drying and milling a methylhydroxyethyl cellulose ether was obtained.

Preparation of Sample PD2

Sample PD2 was prepared in the same manner as Sample PD1, except that the temperature in step d) was maintained for 30 minutes.

Preparation of Sample PD3

Sample PD3 was prepared in the same manner as Sample PD1, except that the temperature in step d) was 65° C.

Preparation of Sample PD4

Sample PD4 was prepared in the same manner as Sample PD3, except that the temperature in step d) was maintained for 30 minutes.

Preparation of Sample PD5

Sample PD5 was prepared in the same manner as Sample PD1, except that the temperature in step d) was 75° C., with no hold in temperature prior to step e); and the temperature in step f) was maintained for 55 minutes.

Preparation of Sample PD6

Sample PD6 was prepared in the same manner as Sample PD1, except that the temperature in step d) was 80° C., with no hold in temperature prior to step e); and the temperature in step f) was maintained for 55 minutes.

Samples PD1-PD6 were subjected to testing as described in Example A above. The results of all of such testing are shown in Table 18 below.

Example 1

Cementitious tile adhesives were prepared according to the above mentioned procedures comprising 35.0% CEM II A-S 42.5, 0.4% CE, and 64.6% Silica sand (0.1-0.35 mm). Three different cellulose ethers were compared. As a benchmark, a commercially available Culminal™ MHEC 15000PFS (Sample REF, available from Ashland Inc.) was compared to cellulose ether Samples B15 (no venting) and A10 (venting), described above. The same samples were additionally tested including a retarder/accelerator combination shown in Table 19.

For open time determination, the ready mixed mortar was applied with a notched trowel (6×6 mm) on a fibre cement plate. Every five minutes 5×5 cm stoneware and earthenware tiles were embedded by loading with a 2 kg weight for 30 seconds. The tile was removed and the backside of the tile was judged. If more than 50% was covered with cementitious tile adhesive, open time was still ok. Open time was finished if less than 50% was covered with cementitious tile adhesive.

TABLE 19

| Sample | Retarder/Accelerator | Water factor (WF) | Visual Open Time (min) | Setting Time (1000 m/s) (h.) |
|---|---|---|---|---|
| REF | — | 0.25 | — | 17.3 |
| REF | +0.15% NaSCN + 0.03% Sodium polyphosphate | 0.25 | 55 | 18.0 |
| B15 | — | 0.26 | — | 15.3 |
| B15 | +0.15% NaSCN + 0.03% Sodium polyphosphate | 0.26 | 65 | 16.0 |
| A10 | — | 0.26 | — | 18.7 |
| A10 | +0.15% NaSCN + 0.03% Sodium polyphosphate | 0.26 | 65 | 20.3 |

The results indicate that the measured setting time is decreased in the order: A10>REF>B15. The difference in the order of setting time is maintained when an accelerator/retarder combination is added to the mortar but shifted to longer times. In comparison to the commercial sample, both A10 and B15 show improved visual open time.

TABLE 18

| Sample No. | % Unsub AGU | Methyl DS | HE MS | Enzyme Unsub % wt | % Blockiness | Setting Time Average (h) | 24-Hour Tensile Strength (Average) (N/mm$^2$) | 7 Day Tensile Strength (N/mm$^2$) | 3 Day Tensile Strength (N/mm$^2$) |
|---|---|---|---|---|---|---|---|---|---|
| PS1 | 11.23 | 1.75 | 0.19 | 0.045 | 0.632 | 11.2 | 0.60 | 1.2 | 1.0 |
| PS2 | 10.08 | 1.78 | 0.17 | 0.128 | 1.824 | 11.9 | 0.60 | 1.1 | 1.1 |
| PS3 | 10.99 | 1.77 | 0.15 | 0.088 | 1.267 | 11.9 | 0.60 | 0.9 | 0.9 |
| PS4 | 6.73 | 1.97 | 0.16 | 0.014 | 0.449 | 8.5 | 0.60 | 1.0 | 1.1 |
| PS5 | 10.22 | 1.78 | 0.18 | 0.087 | 1.378 | 11.6 | 0.60 | 1.1 | 1.0 |
| PS6 | 8.45 | 1.82 | 0.19 | 0.020 | 0.516 | 8.6 | 0.60 | 0.9 | 1.0 |
| PS7 | 10.32 | 1.81 | 0.19 | 0.076 | 1.264 | 11.7 | 0.60 | 1.2 | 0.9 |
| PS8 | 7.01 | 1.86 | 0.18 | 0.017 | 0.525 | 8.8 | 0.60 | 0.9 | 1.2 |
| PS9 | 7.23 | 1.93 | 0.20 | 0.018 | 0.619 | 10.3 | 0.60 | 0.9 | 1.4 |
| PS10 | 12.31 | 1.79 | 0.18 | 0.113 | 1.432 | 12.6 | 0.60 | 1.0 | 1.0 |
| PS11 | 7.51 | 1.86 | 0.13 | 0.031 | 0.886 | 10.3 | 0.60 | 1.1 | 1.1 |
| PS12 | 9.98 | 1.84 | 0.22 | 0.056 | 0.895 | 11.2 | 0.60 | 1.1 | 1.1 |
| PS13 | 7.93 | 1.94 | 0.22 | 0.024 | 0.760 | 9.1 | 0.60 | 1.0 | 1.0 |
| PD1 | 8.76 | 1.83 | 0.14 | 0.064 | 1.237 | 10.6 | 0.60 | 1.1 | 1.0 |
| PD2 | 9.82 | 1.79 | 0.14 | 0.106 | 1.876 | 11.4 | 0.60 | 1.1 | 1.1 |
| PD3 | 9.91 | 1.79 | 0.13 | 0.102 | 1.276 | 10.7 | 0.60 | 1.0 | 1.1 |
| PD4 | 9.90 | 1.77 | 0.12 | 0.086 | 1.362 | 10.9 | 0.60 | 1.0 | 1.1 |
| PD5 | 9.58 | 1.76 | 0.14 | 0.074 | 0.956 | 10.1 | 0.60 | 1.0 | 1.2 |
| PD6 | 9.92 | 1.77 | 0.14 | 0.056 | 0.788 | 9.0 | 0.60 | 0.9 | 1.0 |

Example J

Another cementitious tile adhesive was prepared from 35.0% CEM I 52.5R; 0.4% CE; and 64.6% Silica sand (0.1-0.35 mm). Again the two cellulose ethers, obtained from different processes Samples B15 (no venting) and A10 (venting) were compared in the presence of sodium polyphosphate as a retarder with respect to strength development, setting time and visual open time. Results are shown in Table 20.

TABLE 20

| Sample | Retarder | Water factor | Visual Open Time (min) | Setting Time (1000 m/s) (h.) | Tensile strength Dry/wet/warm (N/mm$^2$) |
|---|---|---|---|---|---|
| B15 | +0.03% Sodium polyphosphate | 0.26 | 65 | 15.8 | 1.1/1.4/1.2 |
| A10 | +0.03% Sodium polyphosphate | 0.26 | 60 | 17.7 | 1.0/1.5/0.9 |

As can be seen from Table 20 the setting time of sample A10 is approximately two hours longer than the setting time of the Sample B15, resulting in improved strength performance after dry and warm storage for Sample B15 over Sample A10. Thus the difference in setting times between the different cellulose ethers is maintained in the presence of retarders. Visual open time, however, is unexpectedly longer in the case of the faster setting Sample B15.

Preparation and Testing of Mortars Containing Encapsulated Calcium Chloride

Heat Evolution of Different Calcium Chloride Salts

Depending on the amount of water incorporated in the crystal, calcium chloride salts exhibit heat evolution or cooling activity during dissolution in water.

Table 19 shows the results obtained when adding water to respective salts and monitoring the thermal activities via heat flow calorimetry. The addition of water to anhydrous $CaCl_2$ results in a distinct heat evolution within the first minutes. Compared to that the heat evolution from calcium chloride dihydrate ($CaCl_2.2H_2O$) is considerably less pronounced, but still positive. In contrast to that calcium chloride hexahydrate ($CaCl_2.6H_2O$) absorbs heat while dissolving and thus results in a cooling of the sample. This demonstrates an important benefit of using anhydrous $CaCl_2$, or $CaCl_2.2H_2O$ (or by inference $CaCl_2.H_2O$ and $CaCl_2.4H_2O$), in mortar formulations where heat addition is needed.

TABLE 21

| CaCl$_2$ Salt | Initial peak heat evolution (mW/g) |
|---|---|
| Anhydrous CaCl$_2$ | +1450 |
| CaCl$_2$•2H$_2$O | +500 |
| CaCl$_2$•6H$_2$O | −500 |

Testing of Mortars

Performance properties were tested using the following base cementitious tile adhesive formulation shown in Table 22 below.

TABLE 22

| Ingredient | Amount, wt % |
|---|---|
| Portland cement CEM I 52.5R | 35 |
| Fine silica sand F35 (50-350 microns) | 62.1 |
| Methylhydroxyethyl cellulose ether (MHEC) | 0.40 |
| Redispersible powder (RDP) from vinylacetate ethylene copolymer | 2.5 |

Example K

Setting Behavior and Strength Development in Mortar Pastes

The different effects of the calcium chloride salts in dry mortar formulations at low temperatures were determined with respect to setting time and strength development. Culminal™ C4053, commercially available from Ashland Inc. was used as MHEC. Results are shown in Table 23.

All ingredients and the measuring device were preconditioned to the desired temperature in a climate chamber. Preparation and measurement were conducted at the desired temperature in the climate chamber.

The cementitious tile adhesive samples were prepared by adding 26% of water to the dry powder formulation (including the base cementitious tile adhesive formulation set out in Table 20 above) and mixing it for 60 seconds. $CaCl_2$ salts were added to the dry powder formulations for Samples 1-3, and the wt %'s shown in Table 22 are based on the weights of the dry ingredients other than $CaCl_2$ salts. Setting time was determined using the same procedures described previously.

Preparation of the mortar and determination of tensile strength were accomplished in accordance with Standard Method DIN EN 1348 at the respective temperature. Flexural and compressive strength were determined in accordance with Standard Method DIN-EN 1015-11 at the respective temperature.

TABLE 23

| Sample | Temp. | CaCl$_2$ salt | Active content Wt % | Wt % | Setting time | Strength development (3 days) (N/mm$^2$) Tensile | Flexural | Compressive |
|---|---|---|---|---|---|---|---|---|
| Ref-1 | 25° C. | None | — | — | 760 | 1.1 | 3.2 | 6.0 |
| Ref-2 | 5° C. | None | — | — | 2600 | 0.7 | 1.5 | 2.0 |
| Ref-3 | 1° C. | None | — | — | 3200 | 0.5 | 0.8 | 1.7 |
| 1 | 1° C. | Anhydrous CaCl$_2$ | 1 | 1 | 900 | 0.7 | 2.2 | 4.3 |
| 2 | 1° C. | CaCl$_2$•2H$_2$O | 1.32 | 1 | 1200 | 0.7 | 1.8 | 3.9 |
| 3 | 1° C. | CaCl$_2$•6H$_2$O | 1.96 | 1 | 1540 | 0.7 | 1.6 | 2.5 |

As can be seen in Table 23, the setting time for Samples 1 and 2 are significantly less than the setting times for the Reference samples at 1° C. and 5° C. which each contained 0% anhydrous calcium chloride, and are also much lower than the setting time for Sample 3, showing the benefit of using calcium chloride which is not completely hydrated, such as anhydrous calcium chloride and $CaCl_2.2H_2O$ (and by inference $CaCl_2.H_2O$ and $CaCl_2.4H_2O$), for decreased setting time. Similarly, the Flexural and Compressive strength values for Sample 1 exceeds the Flexural and Compressive strengths for the Reference sample at 1° C. and 5° C., and that for Samples 2 and 3. Also, the tensile strength values for Samples 1 and 2 exceeds or are equal to the Tensile strength for the Reference sample at 1° C. and 5° C., and that for Sample 3. In addition, the Flexural and Compressive strength values for Sample 2 ($CaCl_2.2H_2O$) exceeds the Flexural and Compressive strengths for Sample 3 ($CaCl_2.6H_2O$). Overall, these results show the benefit of using anhydrous $CaCl_2$ or $CaCl_2.2H_2O$ (and by inference $CaCl_2.H_2O$ and $CaCl_2.4H_2O$) with regard to Tensile, Flexural and Compressive strength of cementitious tile adhesives.

Example L

Water Uptake

Anhydrous calcium chloride shows a strongly hygroscopic and deliquescent behavior. When exposed to humid air, the salt will absorb water from the surrounding air and form a solution. Through the coating of the $CaCl_2$ surface with a non-hygroscopic material this effect can be strongly decreased. Table 24 shows the mass increase due to hydration following exposure of coated and uncoated anhydrous $CaCl_2$ salt to humid air (50% relative humidity, 23° C.) for a time period of 7 days. The coating on the coated anhydrous $CaCl_2$ salt was hydrogenated vegetable oil.

TABLE 24

| $CaCl_2$ Salt | Sample Weight | Active Content | Mass Increase (7 Days) |
| --- | --- | --- | --- |
| Anhydrous $CaCl_2$ | 1 g | 1 g | +1.5 g |
| Coated anhydrous $CaCl_2$ | 2 g | 1 g | +0.4 g |

Example M

Heat Evolution

Although the calcium chloride is coated and thus more stable in the dry mixture, during preparation of the paste slight shear forces are applied breaching the coating, and consequently the heat evolvement takes place instantaneously.

Performance properties were tested using the following base cementitious tile adhesive formulation shown in Table 25 below.

TABLE 25

| Ingredient | Amount, wt % |
| --- | --- |
| Portland cement CEM 1 52.5R | 35 |
| Fine silica sand F35 (50-350 microns) | 64.6 |
| Culminal ™ C4053 | 0.40 |

Heat evolution over time was measured with the help of a heat flow calorimeter working at 23° C. Sample holder, dry mix, water and spatula were placed in the device minimum two hours before measurement in order to be well tempered.

Tile cement paste was prepared through addition of water to tile adhesive formulation in an appropriate sample holder. Sample was homogenized with the help of a spatula for 20 seconds thereby applying shear forces. Without delay the sample was placed into the device and the heat evolvement over time was measured. As shown in Table 26 below, the Reference sample utilized the base cementitious tile adhesive formulation set out in Table 25 above; and Samples 4-8 included the same, but with the addition of anhydrous calcium chloride. Table 26 also shows the measured initial peak heat evolution which occurred in the samples instantaneously (within 2 minutes) after placing sample in device.

TABLE 26

| Sample No. | Coated Anhydrous $CaCl_2$ Added (% based on weight of other dry ingredients) | Sample Weight (g) | Initial Peak Heat Evolution (mW) | Initial Peak Heat Evolution (mW/g) |
| --- | --- | --- | --- | --- |
| Ref. | none | 4 | 72 | 18 |
| 4 | 1% | 4.04 | 88 | 22 |
| 5 | 2% | 4.08 | 100 | 25 |
| 6 | 3% | 4.12 | 108 | 26 |
| 7 | 5% | 4.20 | 156 | 37 |
| 8 | 10% | 4.40 | 225 | 52 |

As can be seen in Table 26, the heat evolution in the presence of the anhydrous calcium chloride for Samples 4-8 exceeds the heat evolution measured in the Reference sample, showing the benefit of using calcium chloride which is not completely hydrated, such as anhydrous calcium chloride (and by inference $CaCl_2.H_2O$ and $CaCl_2.2H_2O$ and $CaCl_2.4H_2O$), for heat evolvement.

Example N

Setting Time and Strength Development

As shown in Table 27 below, the Reference samples utilized the base cementitious tile adhesive formulation set out in Table 25 above; and Sample 9 included the same, but with the addition of coated anhydrous calcium chloride. The samples were filled into the measurement device and the velocity of the ultra sonic wave was measured every 10 minutes. The test results are shown in Table 27.

TABLE 27

| Sample No. | Temp. | Coated anhydrous CaCl₂ Added (% based on weight of other dry ingredients) | Setting Time (min) | Strength development (3 days) (N/mm²) | | |
|---|---|---|---|---|---|---|
| | | | | Tensile | Flexural | Compressive |
| Ref-1 | 25° C. | 0% | 1000 | 0.9 | 2.8 | 6.2 |
| Ref-2 | 5° C. | 0% | 2800 | 0.6 | 2.2 | 1.9 |
| Ref-3 | 1° C. | 0% | 3600 | 0.4 | 1.6 | 1.8 |
| 9 | 1° C. | 1.5% | 1700 | 0.7 | 2.3 | 4.4 |

As can be seen in Table 27, the setting time at 1° C. in the presence of the anhydrous calcium chloride for Sample 9 is significantly less than the setting time for the Reference samples at 1° C. and 5° C. which contained 0% anhydrous calcium chloride, showing the benefit of using calcium chloride which is not completely hydrated, such as anhydrous calcium chloride (and by inference $CaCl_2.H_2O$ and $CaCl_2.2H_2O$ and $CaCl_2.4H_2O$), for setting time. Similarly, the Tensile, Flexural and Compressive strength values for Sample 9 each exceeds the various strengths for the Reference samples at 1° C. and 5° C., showing the benefit of using calcium chloride which is not completely hydrated, such as anhydrous calcium chloride (and by inference $CaCl_2.H_2O$ and $CaCl_2.2H_2O$ and $CaCl_2.4H_2O$), for Tensile, Flexural and Compressive strength of cementitious tile adhesives.

Example O

Performance of the cellulose ethers in cementitious tile adhesive formulation (35.0% CEM I 52.5R; 0.4% CE; and 64.6% Silica sand (0.1-0.35 mm) was determined at low temperatures. As a benchmark, a commercially available Culminal™ MHEC 15000PFS (Sample REF, available from Ashland Inc.) was compared to cellulose ether Samples B15 (no venting), described previously. All ingredients and the measuring device were preconditioned to 5° C. in a climate chamber. Preparation and measurement were conducted at the desired temperature in the climate chamber according to the above mentioned procedures. Dry tensile strength was determined for the Samples in Table 28 after 7 days in the climate control environment at 5° C. and 100% r.H.

TABLE 28

| Sample No. | Temperature | CaCl₂ | WF | Setting Time (1000 m/s) (h) | Tensile Strength 7 Day Dry, N/mm² |
|---|---|---|---|---|---|
| REF | 5° C. | — | 0.25 | 46.7 | 0.61 |
| REF | 5° C. | +0.5% encapsulated CaCl₂ | 0.25 | 31.7 | 0.70 |
| B15 | 5° C. | — | 0.26 | 41.7 | 0.67 |
| B15 | 5° C. | +0.5% encapsulated CaCl₂ | 0.26 | 28.3 | 0.85 |

At 5° C. the setting times are strongly delayed due to the slower hydration reaction of cement at low temperatures as can be seen in Table 28. Nevertheless Sample B15 shows a significantly faster setting behavior than the REF sample. In the presence of 0.5% of encapsulated $CaCl_2$ the mortar hydration is accelerated and thus the setting times are shifted towards shorter setting times. The beneficial effect of a faster setting of mortars prepared with sample B15 is still significant in the presence of encapsulated $CaCl_2$.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Changes may be made in the construction and the operation of the various components, elements and assemblies described herein, and changes may be made in the steps or sequence of steps of the methods described herein without departing from the spirit and the scope of the invention as defined in the following claims.

What is claimed is:
1. A method comprising:
   a) mixing an alkaline solution comprising an alkali metal hydroxide with cellulose and an alkyl halogenide at a temperature of at least 10° C. to form a first reaction mixture comprising alkali cellulose, water, and the alkyl halogenide, wherein the alkali metal hydroxide is present in an amount of from about 2.92 to about 5.00 equivalents per anhydroglucose unit of the cellulose;
   b) adjusting the temperature of the first reaction mixture to be within a range of from about 60 to about 110° C. resulting in a reaction of a portion of the alkyl halogenide with the alkali cellulose forming a second reaction mixture comprising alkyl cellulose ether and unreacted alkyl halogenide, wherein the second reaction mixture is maintained at a temperature within the range of from about 60 to about 110° C. prior to the addition of an alkylene oxide;
   c) cooling the second reaction mixture to a temperature in a range of from about 25 to about 80° C. to form a third reaction mixture;
   d) adding the alkylene oxide to the third reaction mixture from step c) to form a fourth reaction mixture;
   e) adjusting a temperature of the fourth reaction mixture from step d) to be in a range of from about 80 to about 110° C. and reacting at least a portion of the alkyl cellulose ether in the fourth reaction mixture with: i) at least a portion of the alkylene oxide, and ii) at least a portion of the unreacted alkyl halogenide, thereby forming a fifth reaction mixture comprising an alkyl hydroxyalkyl cellulose ether having a methyl D.S. value of from about 1.40 to about 2.10, and a hydroxyethyl M.S. value of from about 0.05 to about 0.4; and
   f) recovering the alkyl hydroxyalkyl cellulose ether from the fifth reaction mixture from step e).

2. The method of claim 1, wherein the alkali metal hydroxide comprises sodium hydroxide.

3. The method of claim 1, wherein the alkyl halogenide comprises methyl chloride, the alkylene oxide comprises ethylene oxide, and the fifth reaction mixture comprises methyl hydroxyethyl cellulose ether.

4. The method of claim 1, wherein the first, second, third, fourth, and fifth reaction mixtures each further comprise a diluent.

5. A process for preparing a wet mortar comprising mixing a dry mixture composition comprising cement, aggregate, and an alkyl hydroxyalkyl cellulose ether prepared by the method of claim 1 with water and thereby applying shear forces.

6. A process for preparing a mortar comprising the steps of:
a) combining a first dry mixture comprising cement, aggregate, and the alkyl hydroxyalkyl cellulose ether prepared by the method of claim 1 with capsules comprising a $CaCl_2$ compound at least partially coated with a coating material to form a second dry mixture; wherein the $CaCl_2$ compound comprises a compound selected from the group consisting of anhydrous $CaCl_2$, $CaCl_2 \cdot H2O$, $CaCl_2 \cdot 2H_2O$, $CaCl_2 \cdot 4H_2O$, and combinations thereof; and wherein, on average for the capsules, at least about 70% by weight of the $CaCl_2$ compound surfaces are coated by the coating material;
b) adding water to the second dry mixture thereby forming a water-containing mixture; and
c) mixing the water-containing mixture, thereby applying shear forces to breach the coating material of the capsules to release the $CaCl_2$ compound and form the mortar; wherein the water hydrates the $CaCl_2$ compound resulting in a heat release of at least about 50 kJ/kg of $CaCl_2$ in the $CaCl_2$ compound and thereby raising a temperature of the mortar.

7. The process of claim 6, wherein the first dry mixture, the second dry mixture, and the water-containing mixture are each at a temperature less than or equal to 15° C.

8. The process of claim 6, wherein the ambient temperature at which steps b) and c) are performed is less than or equal to 15° C.

9. The process of claim 6, wherein the time period for hydration of the cement in the mortar is reduced as compared to the time period for hydration of cement in an identical mortar not prepared using the capsules.

10. The process of claim 6, wherein the average particle size of the capsules is less than or equal to 5 mm.

11. The process of claim 6, wherein the coating material is hydrophobic.

12. The process of claim 6, wherein the mortar is cured to form a cured mortar, and wherein the cured mortar has a compressive strength higher than the compressive strength of an identical cured mortar not prepared using the capsules.

13. The process of claim 6, wherein the mortar is cured to form a cured mortar, and wherein the cured mortar has a flexural strength higher than the flexural strength of an identical cured mortar not prepared using the capsules.

* * * * *